United States Patent
Guthrie

(10) Patent No.: US 8,540,224 B2
(45) Date of Patent: Sep. 24, 2013

(54) VARIABLE AMPLITUDE SINE WAVE SPRING

(76) Inventor: Walker Lee Guthrie, Brownsville, TN (US)

( * ) Notice: Subject to any disclaimer, the term of this patent is extended or adjusted under 35 U.S.C. 154(b) by 58 days.

(21) Appl. No.: 13/297,504

(22) Filed: Nov. 16, 2011

(65) Prior Publication Data

US 2012/0125699 A1    May 24, 2012

Related U.S. Application Data

(63) Continuation-in-part of application No. 13/021,867, filed on Feb. 7, 2011.

(60) Provisional application No. 61/387,546, filed on Sep. 29, 2010.

(51) Int. Cl.
*F16F 1/20* (2006.01)

(52) U.S. Cl.
USPC ........... 267/165; 267/164; 267/229; 267/244; 267/263

(58) Field of Classification Search
USPC ................. 267/52, 260, 263, 36.1, 164, 165, 267/229, 244
See application file for complete search history.

(56) References Cited

U.S. PATENT DOCUMENTS

| | | | | |
|---|---|---|---|---|
| 854,238 A | | 5/1907 | Reilly | |
| 1,384,229 A | * | 7/1921 | Bolich | 40/204 |
| 1,590,211 A | * | 6/1926 | Simons | 267/47 |
| 1,859,105 A | * | 5/1932 | Munro | 267/38 |
| 3,635,534 A | * | 1/1972 | Barnett | 384/106 |
| 3,674,251 A | * | 7/1972 | Tirabassi | 267/162 |
| 4,082,375 A | | 4/1978 | Fortmann | |
| 4,277,112 A | * | 7/1981 | Heshmat | 384/124 |
| 4,277,113 A | * | 7/1981 | Heshmat | 384/124 |
| 4,315,359 A | * | 2/1982 | Gray | 29/898.02 |
| 4,315,660 A | * | 2/1982 | Glienicke | 384/103 |
| 4,331,365 A | * | 5/1982 | Miller, Jr. | 384/105 |
| 4,612,429 A | * | 9/1986 | Milianowicz | 200/288 |

(Continued)

FOREIGN PATENT DOCUMENTS

| | | |
|---|---|---|
| DE | 202004011543 | 10/2004 |
| EP | 0795696 | 9/1997 |
| WO | WO2007062340 | 5/2007 |

OTHER PUBLICATIONS

"Crest-to-Crest Wave spring from Stonsprings" http://www.stonspring.com/en/products.asp?id=8 (c) 2009.

(Continued)

*Primary Examiner* — Thomas Irvin
(74) *Attorney, Agent, or Firm* — Robert Platt Bell

(57) ABSTRACT

A spring is formed of a relatively thin sheet of spring material, which is constricted and held in place at each end forming a bell curve being located between two substantially planar members. As additional compressive force is applied in the vertical direction, the curve then compresses and starts to form sine waves. In an improved embodiment of the present invention, the sine wave spring is formed in a wedge shape, so that it is gradually taller and more progressive. This embodiment has been tested for use as a trailer spring with positive results. This wedge-shaped sine wave spring provides even more advantages over the Prior Art. The wedge-shaped prototype illustrates also how the present invention may be expanded to other shapes, in order to alter the spring characteristics, and also for packaging and other concerns.

20 Claims, 23 Drawing Sheets

(56) References Cited

U.S. PATENT DOCUMENTS

| | | | |
|---|---|---|---|
| 4,708,757 A | 11/1987 | Guthrie | |
| 5,325,008 A | 6/1994 | Grant | |
| 5,622,358 A | 4/1997 | Komura et al. | |
| 5,639,074 A | 6/1997 | Greenhill et al. | |
| 5,860,637 A * | 1/1999 | Mandon | 267/45 |
| 5,961,217 A * | 10/1999 | Heshmat | 384/105 |
| 6,068,250 A | 5/2000 | Hawkins et al. | |
| 6,250,618 B1 | 6/2001 | Greenhill | |
| 6,254,071 B1 | 7/2001 | Greenhill | |
| 6,408,631 B1 | 6/2002 | Sylvia | |
| 6,598,406 B2 | 7/2003 | Sylvia | |
| 6,758,465 B1 | 7/2004 | Greenhill et al. | |
| 6,964,522 B2 * | 11/2005 | Kang et al. | 384/103 |
| 7,210,181 B1 | 5/2007 | Price | |
| 7,334,784 B2 | 2/2008 | Kobelev et al. | |
| 7,344,005 B2 * | 3/2008 | Meernik | 188/67 |
| 7,418,858 B2 | 9/2008 | Fischer et al. | |
| 2005/0258205 A1 | 11/2005 | French | |
| 2006/0266000 A1 | 11/2006 | Morris et al. | |
| 2007/0267792 A1 | 11/2007 | Elmoselhy | |
| 2010/0006700 A1 | 1/2010 | Stuhr et al. | |

OTHER PUBLICATIONS

"Wave Spring Washer" http://www.springmasters.com/spring-washers.html (c) 2011.

http://www.alibaba.com/product-gs/309927904/wave_spring_wave_spring_washer_spring.html Printed Dec. 10, 2011.

"FSA Mega Exo Light BB Wave Spring Washer" Printed Dec. 10, 2011 http://www.amazon.com/FSA-MegaExo-Light-Spring-Washer/dp/B001GSSIUE.

Non-Weld Bow Spring Centralizer (SH01) from SledgeHammer Printed Dec. 10, 2011 http://www.sledgehammerasia.com/non_weld_bow_spring_centralizer.html.

"What Are Wave Springs?" http://www.wave-springs.eu/WAVE+SPRING Printed Dec. 10, 2011.

* cited by examiner

VARIABLE AMPLITUDE SINE WAVE SPRING

CROSS-REFERENCE TO RELATED APPLICATIONS

The present application is a Continuation-In-Part of U.S. patent application Ser. No. 13/021,867, filed Feb. 7, 2011, which in turn claims priority from Provisional U.S. Patent Application No. 61/387,546 filed on Sep. 29, 2010, both applications are incorporated herein by reference.

FIELD OF THE INVENTION

The present invention relates to springs. In particular, the present invention is directed toward a spring made from a flat plate material, forced into a sine wave shape.

BACKGROUND OF THE INVENTION

Guthrie, U.S. Pat. No. 4,708,757, issued Nov. 24, 1987 to the same inventor as the present application, discloses a method of forming a corrugated panel. In the Guthrie '757 Patent, a corrugated panel in which at least the central corrugated sheet is formed from an elastically deformable material such as polyethylene synthetic plastic or spring steel is disposed and secured between a pair of cover sheets. The method of forming the panel includes stretching out a first of the cover sheets and thereafter attaching the ends of the sheet to be corrugated to the first sheet while maintaining the spacing between the remainder of the sheet. This forms a half sinusoidal shape from the sheet to be corrugated. A compressive force is thereafter applied to the sheet to be corrugated which forms it into a number of corrugations having ridges and furrows. The furrows are bonded to the base sheet and a third sheet is positioned on and bonded to the ridges of the corrugated sheet.

Referring to FIGS. 1-6, and particularly to FIG. 1, a panel 10 constructed in accordance with the principles of the Prior Art invention comprises first and second sheets 12, 14 of flexible elastically deformable material preferably a thin sheet of metal such as spring steel or a synthetic plastic such as polyethylene between which a third sheet 16 of similar material is sandwiched. The third sheet 16 is corrugated or wave shaped and is secured to the first and second sheets at respective peaks or ridges of the waves while in a pre-stressed state resulting from the forces applied to the third sheet when forming the corrugated configuration as hereinafter described. The manner of forming the corrugation effects a curvilinear configuration throughout the third sheet, which configuration is substantially sinusoidal.

The panel 10 may be utilized for various purposes such as for packaging, but since the corrugations can be of a large size, the panels have application for wall structures and partitions. Moreover, as illustrated in FIG. 2, especially where the sheets are of synthetic plastic, the voids between the waves of the third sheet and the respective first and second sheets may be filled with an insulating material such as polyurethane foam 18 and the resulting product may be used as insulating wall panels in buildings. Because of the pre-stressed state of the third sheet the panels have substantial strength, but if desired they may be re-enforced to provide a more rigid structure by the addition of stiffeners (not illustrated) between the first and second sheets extending substantially perpendicular to the plane of the waves formed, i.e., substantially parallel to the longitudinal axis of the panel.

The method of forming the panel 10 comprises securing the first sheet 12 substantially at its ends 20, 22 on a flat surface 23 or at least in a stretched disposition so that it forms a substantially planar surface. This may be accomplished by holding the ends by clamping means 24, 26. Thereafter the third sheet 16 is disposed on the first sheet and the ends thereof secured by clamping to the first sheet. The third sheet may be the same size as the first sheet in which case the third sheet is clamped to the first sheet at a disposition spaced from the ends of the first sheet or the third sheet can be longer than the first sheet and clamped at or adjacent the ends of the first sheet. In either case, the ends 28, 30 of the third sheet may be clamped by clamping means 32, 34. The length of the third sheet or the spacing of its ends 28, 30 relative to the ends of the first sheet is dependent upon the number of waves desired in the corrugation of the third sheet. This forms a curvilinear member from the third sheet in a single wave form of a substantially one-half sine wave as illustrated in FIG. 3.

Thereafter a gradual compressive force F is applied equally upon the third sheet at the crest thereof and directed toward the first sheet. This can be applied by a platen or other substantially flat beam 36 or the like applied to the top of the third sheet in a planar direction toward the first sheet. Due to the resiliency of the third sheet this force initially results in the third sheet being deformed to form a two wave curvilinear configuration as illustrated in FIG. 4. Continued application of the compressive force to the third sheet results in an increasing number of wave forms, each of which is substantially of a sine configuration. The number of curves appears to be exponentially related to the force applied to the third sheet.

When the desired number of curves are formed, or stated differently, when the desired amplitude of the crest of the third sheet relative to the first sheet is attained, the first and third sheets are bonded together at the contact point 38. The second sheet 14 may thereafter be disposed on the peaks of the third sheet remote from the first sheet and bonded thereto. Alternatively, the second sheet may be disposed on the third sheet prior to application of the compressive force intermediate the third sheet and the platen 36 and bonding of the third sheet to the first and second sheets may occur substantially simultaneously in the process. In either case when the platen is released the third sheet has been pre-stressed by an amount substantially equal to that of the compressive force and has large load bearing capacity.

A modification of the process may be utilized to form curved bodies and cylindrical members by utilizing a complimentary shaped member against which the first sheet is disposed and a platen also of that shape can be compressed toward the first sheet. For example, as illustrated in FIG. 6, to form a cylindrical body a mandrel in the form of a central member 123 having the size and shape of the inner diameter of the cylindrical body has the first sheet 112 fastened thereto. The third sheet 116, which in this case has a greater circumferential size than the first sheet, can be attached to the first sheet at its ends and a platen 136 in the form of a number of sectors 137 may be disposed about the third sheet and the sectors forcibly drawn radially inwardly to corrugate the third sheet. The second sheet can thereafter be attached to the third sheet to form the corrugated cylindrical body.

In the Prior Art invention, as illustrated in FIGS. 1-6, the sinusoidal sheet is attached at the peaks of the sine wave portions to the adjacent sheets to form a lightweight panel which may be suitable for a number of uses, including aircraft construction. However, the apparatus of the Prior Art utilized the sine wave construction and the compression of the intermediate layer only for the purposes of construction of a rigid panel.

Springs using sine-wave shaped portions are known in the art. However all of such springs utilize materials that are permanently deformed into a sine wave shape. That is to say, they are stamped, pressed, molded or otherwise shaped into a sine wave form, such that even when pressure is removed, they return to a sine wave shape. A number of Patents exist which illustrate such sine wave shapes.

Syoichi, U.S. Pat. No. 5,622,358, issued Apr. 22, 1997, and incorporated herein by reference, discloses a wave spring. Syoichi discloses a wave spring formed in which a linear relation is retained between a load (P) and a deflection (S). Thereby, the degree of freedom of design of springs is enhanced. In forming a spring structure by coiling a spring material having flat cross section, a clothoid curve is selectively used as a shape-determining factor for the spring structure. This spring, however, is more of a conventional spring with a continuous spring rate.

Sylvia, U.S. Pat. No. 6,408,631, issued Jun. 25, 2002 and incorporated herein by reference, discloses a wave spring loaded split seal system. A piston includes a circumferential groove having a seal ring and spring mounted within the groove. The spring exerts an axial force on the seal ring thereby preventing motion of the seal ring within the groove. Preferably, the spring is a wave spring, wherein small changes in deflection of the wave spring produces small changes in the load generated by the spring on the seal ring. The seal ring has at least one radial spring ring mounted within the seal ring to create a radial force on the seal ring. The piston can also include a sleeve that mounts to the piston body, the sleeve forming a wall of the groove. The piston can be a displacer mounted within a cylinder of a refrigerator. This spring, also, is more of a conventional spring with a continuous spring rate.

Shibuya, European Patent No. EP0795696, issued Mar. 24, 1999 and incorporated herein by reference, discloses a coiled wave spring and production method thereof. A coiled wave spring is obtained by winding a corrugated wire into a coil shape, wherein mutually overlapping top portions and mutually overlapping base portions of the spring are in mutual contact and predetermined gaps are defined between mutually overlapping slope portions which connect the top and base portions. The first loop of the spring, that is, on the upper side, and the second loop, that is, on the lower side, are in mutual contact in an axial direction thereof only between the top portions and between the base portions, and the gaps are defined between the slope portions to prevent mutual contact. When the spring receives a load and undergoes deformation, the top portions and the base portions come into mutual contact, respectively, but hardly generate friction; Since the gaps are defined between the mutually overlapping slope portions, friction does not occur at these portions, either. This spring, also, is more of a conventional spring with a continuous spring rate.

Greenhill, U.S. Pat. No. 6,250,618, issued Jun. 26, 2001, and incorporated herein by reference, discloses a curved wave shim. A curved wave shim is formed from a flat elongated wire strip which follows a sinusoidal wave path that includes a series of waves spaced about the curved wave shim path, each wave having a shoulder portion which bears against generally parallel surfaces of the working elements positioned on a shaft or in a cylinder bore. The shim fits in a rectangular groove formed either on a shaft or in a cylinder bore, the axial height of the groove being slightly greater than the distance between successive wave crests and troughs. This spring, also, is more of a conventional spring with a continuous spring rate. Note that the sine wave shapes in this spring, as in the previously cited references, are pressed into shape and are permanent.

Price, U.S. Pat. No. 7,210,181, issued May 1, 2007 and incorporated herein by reference, discloses a spring construction. An improved spring construction for mattresses, box springs, furniture and other applications is provided. The application of such springs in mattresses, box springs, furniture and other applications is also provided. In one aspect of the invention, the spring construction is a spring including a series of spring segments, each having a flattened, irregular configuration where the spring varies in compression strength and deflection from a top portion thereof to a bottom portion thereof. Note that the sine wave shapes in this spring, as in the previously cited references, are pressed into shape and are permanent.

Fortmann, U.S. Pat. No. 4,082,375, issued Apr. 4, 1978 and incorporated herein by reference, discloses a dual wedge fluid thrust bearing including wave spring. A dual wedge thrust bearing for holding two relative rotating members in spaced relation includes a wave spring which supports both a thick flexible plate and a thin flexible plate stacked in that order between the cooperating bearing surfaces of the members. By securing the leading edge of the thin plate to the member on which the wave spring rests and in spaced relation to the cooperating bearing surface, a wedge-shaped passage is formed to create a fluid bearing which is efficient for low speeds and loads. At high speeds and loads, when the thin plate would have sagged making an inefficient wedge, the thick plate deflects against the spring at its leading edge to form a more efficient wedge-shaped opening between it and the cooperating bearing surface. Note that the sine wave shapes in this spring, as in the previously cited references, are pressed into shape and are permanent.

All of the aforementioned Prior Art Patents relating to spring designs have one feature in common—while they disclose shapes that may incorporate a sine wave feature, the shapes are fixed in that they are stamped, pressed, or otherwise formed into the spring material and form part of the spring. Applicant's earlier Patent discloses a sine wave corrugated material, but one that was fixed into position in the form of a bonded, corrugated sheet.

SUMMARY OF THE INVENTION

As disclosed in the background above, in applicant's prior patent, a process is used to form a sine wave shape using a sheet of Mylar (the trade name for Biaxially-oriented polyethylene terephthalate). Mylar is fairly ridged/springy material. A Mylar sheet material, when placed under pressure, will buckle up in the middle to form a bell curve. Taking a sheet of this material, and attaching the ends of the material to a table, one can then apply a planar force with a flat surface at the top of the curve. The curve then compresses and starts to form sine waves. The greater the force, progressively higher the wave frequency with lower amplitude would form. This process works with any resilient/springy material i.e. spring steel, Mylar, 2024-T3 aluminum, and epoxy impregnated carbon fiber.

In Applicant's original process patent (U.S. Pat. No. 4,708, 757, previously incorporated by reference) this technique was used to form high strength-to-weight panels and trusses by using a large force to produce a light weight structure. The Mylar (or other material) may be formed into shape using the process outlined above, and then fixed into position to form a lightweight corrugated panel. This process is still in use for various applications and is being adapted for new structures, including aircraft wings.

In adapting this technology, applicant discovered that in addition to fixing the sine wave material into place to form a corrugated panel, the technique may be modified to provide a relatively flat sine wave spring, which may have a number of applications. For example, a lightweight support system (e.g., for piping and the like) may be fabricated using this wave function. In the original process set forth in applicant's previous Patent, the core material was bonded to the face sheets to form a sandwich panel. In the present invention, the core material is not bonded to the face sheets but instead forms a spring support system able to shift and flex, base on the load. A number of applications are provided where a spring support system may be used to under extreme forces over a wide range.

In measuring the force to form the waves, the present inventor noted that the force needed to shift the curve (increase the number of waveforms) increases at an exponential rate, as opposed to the linear rate of most normal springs. Hook's law is a strictly a linear function. Some conventional spring applications (such as discussed above) may use spring material of varying thickness or mechanical cams to modify this function, but these do not approach the exponential spring rate of the sine wave spring of the present invention.

The present inventor also noted that the force needed to maintain the compressed spring in each of the new phases was considerably less than the threshold force needed to form it. This energy absorbing effect is key to the self-dampening nature of the spring. This effect prevents the undesirable recoil of undampened spring systems. Some crash attenuation barriers, for example, use a core material that crushes down to absorb the energy of impact. The core may be made of a material like aluminum that does not recoil, which prevents a secondary impact from on the passengers of a vehicle. A crash barrier made of a pure spring system, on the other hand, may rebound after impact, re-transmitting force back to the vehicle that compressed the barrier.

This exponential spring rate is a unique feature of the present invention. There are a number of applications, particularly in the area of shock absorption, where this spring rate may be useful, as will be discussed below in connection with the Detailed Description of the Drawings.

In an improved embodiment of the present invention, the sine wave spring is formed in a wedge shape, so that it is gradually taller and more progressive. This embodiment has been tested for use as a trailer spring with positive results. This wedge-shaped sine wave spring provides even more advantages over the Prior Art. The wedge-shaped prototype illustrates also how the present invention may be expanded to other shapes, in order to alter the spring characteristics, and also for packaging and other concerns.

BRIEF DESCRIPTION OF THE DRAWINGS

FIG. 22 is a perspective view of one application of the present invention, for use as a crash barrier for a highway guard rail or the like.

FIG. 23 is a perspective view of one application of the present invention, for use as spring seat support for a vehicle or the like.

FIG. 38 is a side view of one application of the present invention, for use as a safety bumper spring for a tractor trailer or the like.

FIG. 41 is a perspective view of one application of the present invention, for use as spring seat support for a vehicle or the like.

DETAILED DESCRIPTION OF THE INVENTION

Figure 1:
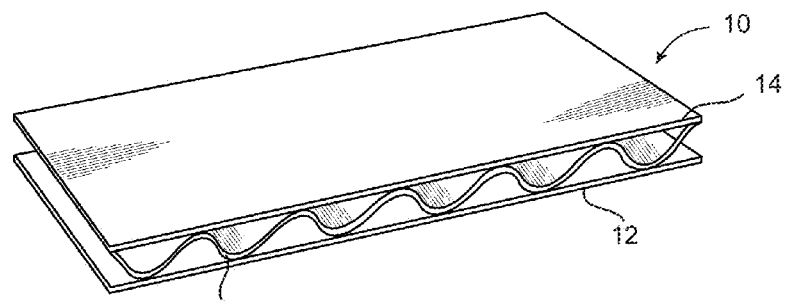
FIG. 1 is a perspective view of a panel constructed in accordance with the principles of the Prior Art invention.
Figure 2:
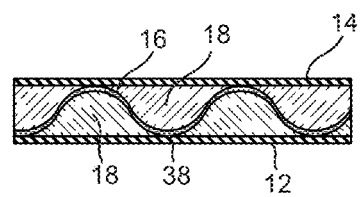
FIG. 2 is a sectional view taken through a portion of a modified panel constructed in accordance with the Prior Art invention.
Figure 3:
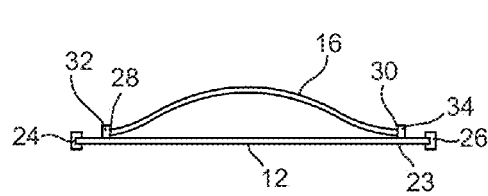
FIG. 3 is a schematic representation of a step in the process of forming a panel according to the method of the Prior Art invention.
Figure 4:
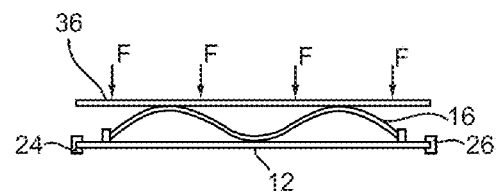
FIG. 4 is a view similar to FIG. 3 but of a subsequent step in the Prior Art process.
Figure 5:
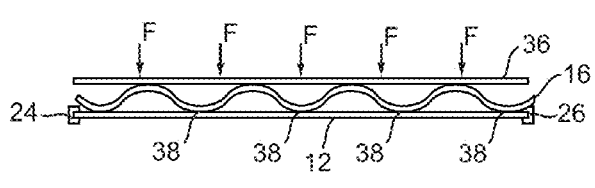
FIG. 5 is a view similar to FIG. 4 of a still subsequent step in the Prior Art process.
Figure 6:
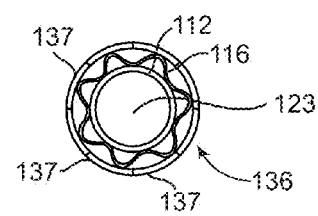
FIG. 6 is a schematic representation of the use of the process for constructing a cylindrical panel structure.
Figure 7:
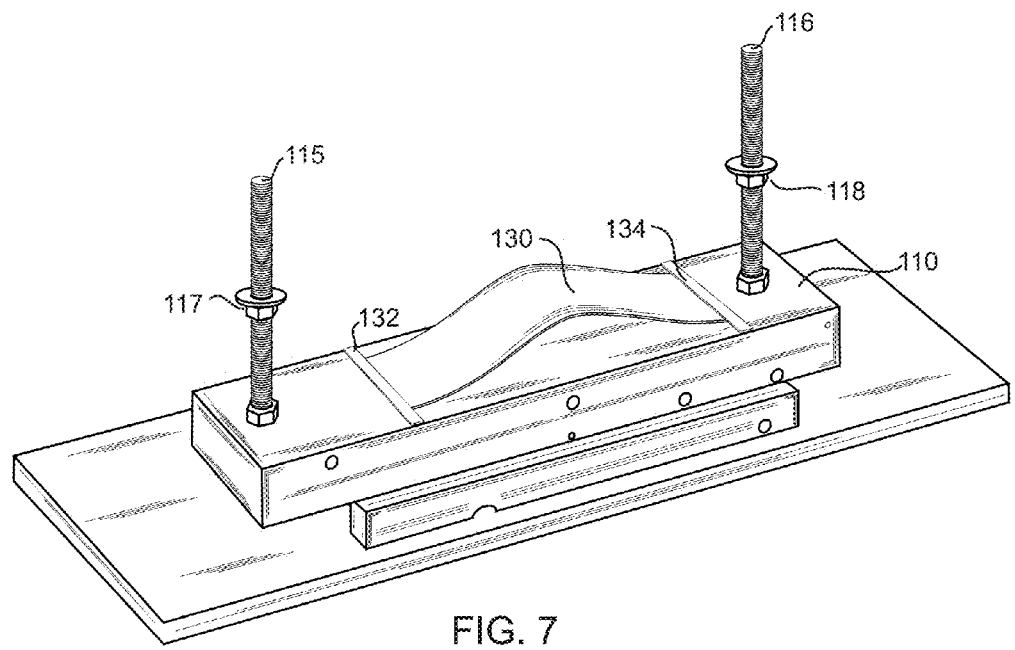
FIG. 7 is a perspective view of the test cell used in the present invention to demonstrate the operation of the sine wave spring, illustrating the spring material placed on the bed portion.
Figure 8:
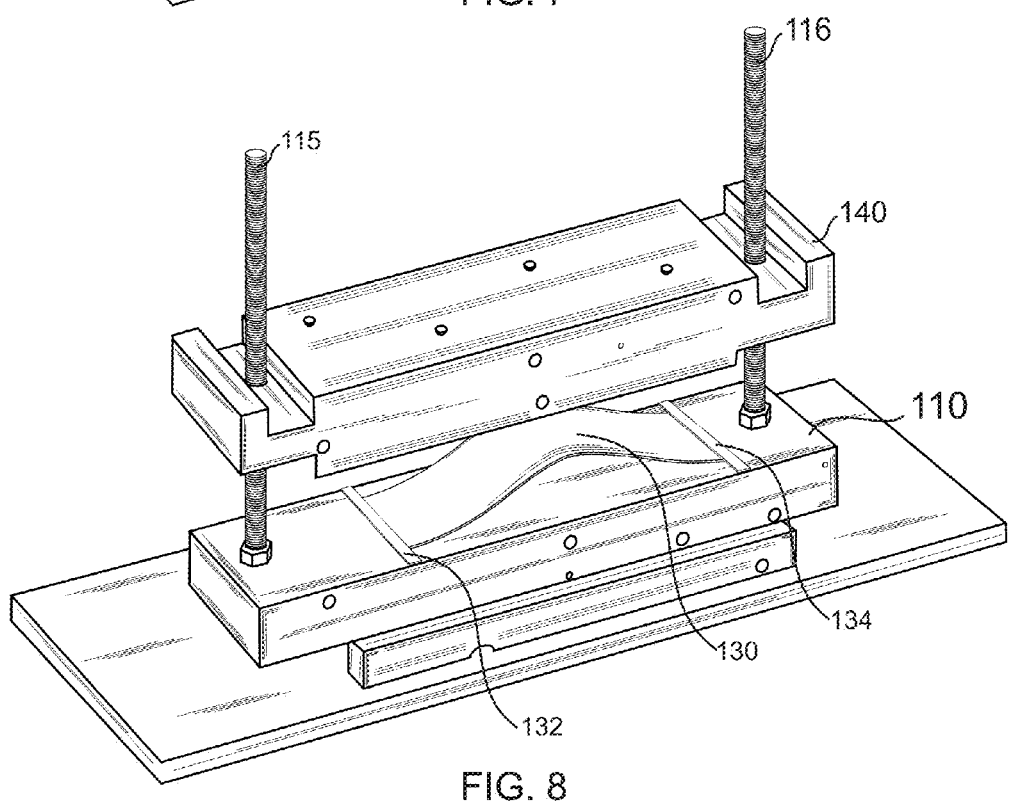
FIG. 8 is a perspective view of the test cell used in the present invention to demonstrate the operation of the sine wave spring, illustrating the spring material placed on the bed portion and the upper planar member attached.
Figure 9:
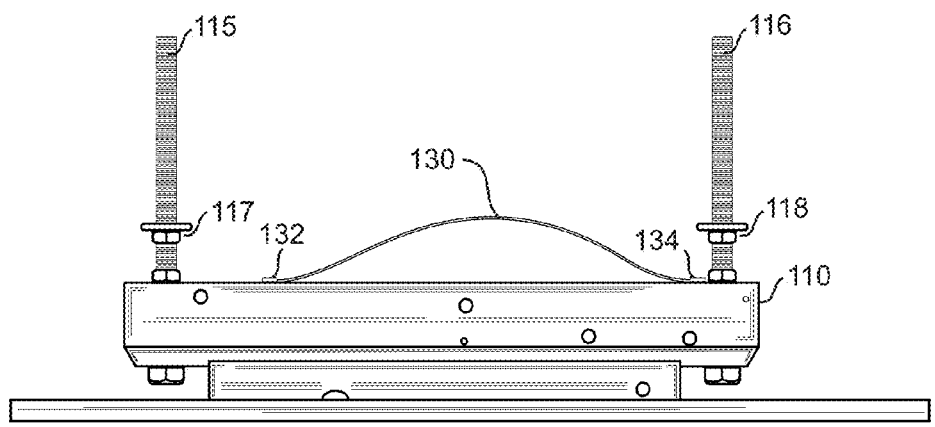
FIG. 9 is a front view of the test cell used in the present invention to demonstrate the operation of the sine wave spring, illustrating the spring material placed on the bed portion.

FIGS. 7-15 illustrate how the spring of the present invention works, as installed on a test bed device for the purposes of illustration. FIG. 7 is a perspective view of the test cell used in the present invention to demonstrate the operation of the sine wave spring 130, illustrating the spring material 130 placed on the bed portion or platen 110. The spring 130, as noted previously, could be made of a Mylar material, spring steel, 2024-T3 aluminum, and epoxy impregnated carbon fiber, or other flexible materials. Stops 132, 134 are provided at each end of the spring material 130 on platen 110 to hold the sheet 130 in place on the platen 130. Note that the spring material 130 lays flat at the end portions near the stops 132, 134 on the platen 130. FIG. 9 is a front view of the test cell used in the present invention to demonstrate the operation of the sine wave spring 130, illustrating the spring material 130 placed on the platen 110.

FIG. 8 is a perspective view of the test cell used in the present invention to demonstrate the operation of the sine wave spring 130, illustrating the spring material 130 placed on the platen 110 and the upper planar member or top plate 140 attached. Here, a top plate 140 has been added to the device. For testing purposes, threaded rods 115, 116 may be used to compress the top plate 140 onto the spring material. Alternately, weights may be added to the top plate 140 to increase load on the spring. Both the platen 110 and top plate 140 are substantially planar in the preferred embodiment, although it is within the spirit and scope of the present invention to provide a curved or other type of surface for compressing the spring 130.

Figure 10:
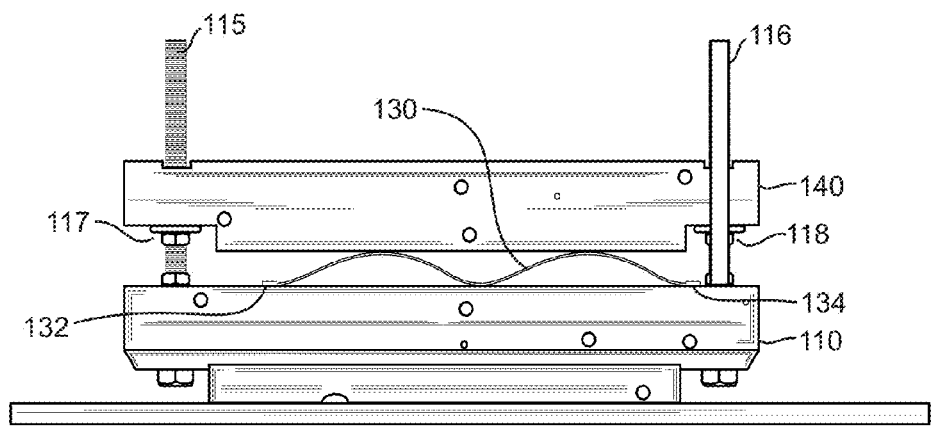
FIG. 10 is a front view of the test cell used in the present invention to demonstrate the operation of the sine wave spring, illustrating the spring material placed on the bed portion and the upper planar member attached, with sufficient weight applied to the spring to cause it to form two waveforms. The force needed to keep the spring at this stable state is found empirically to be a small percent of the threshold force.

FIG. 10 is a front view of the test cell used in the present invention to demonstrate the operation of the sine wave spring 130, illustrating the spring material 130 placed on the bed portion 110 and the upper planar member 140 attached, with sufficient weight or force applied to the spring 130 to cause it to form two waveforms. Here the top plate 140 has been brought into contact with the spring. Stop nuts 117, 118 on the threaded rods 115, 116 on the test stand may be used to hold back the top plate so that the operation of the spring may be illustrated and also to prevent the spring from overload. In this test rig, both top plate 140 and platen 110 may be made of, for example, wood, metal, or concrete, and thus provide a sufficient load to compress the spring 130. As illustrated in FIG. 10, the flexible sheet comprising spring 130 assumes a sine-wave shape when load is applied, in this instance, two wavelengths. When the load is applied, the flexible sheet 130 "snaps" into this position, sometimes accompanied by a snapping noise. At this stable state, a minimum force is required to maintain the sine wave in this shape.

Figure 11:
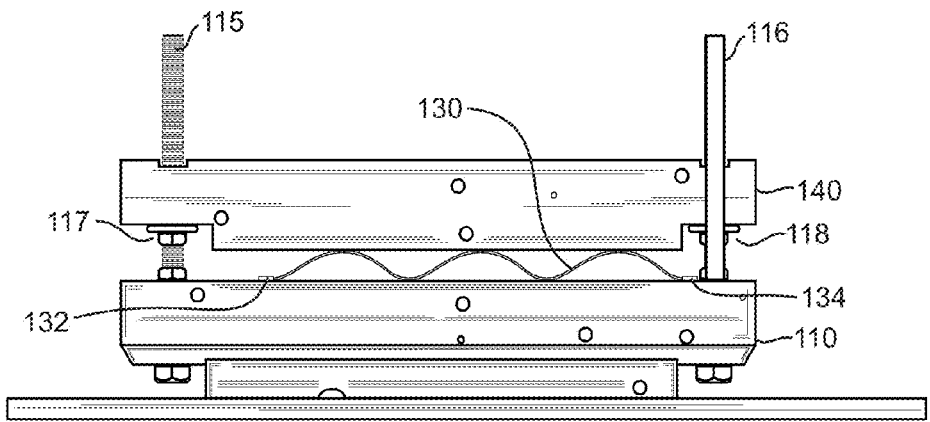
FIG. 11 is a front view of the test cell used in the present invention to demonstrate the operation of the sine wave spring, illustrating the spring material placed on the bed portion and the upper planar member attached, with additional weight (or pressure) applied to the spring to cause it to form three waveforms. Here, the force needed to maintain the system in this stable stat is a small percent of the threshold force.

FIG. 11 is a front view of the test cell used in the present invention to demonstrate the operation of the sine wave spring 130, illustrating the spring material 130 placed on the bed portion 110 and the upper planar member 140 attached, with additional weight (or pressure) applied to the spring 130 to cause it to form three waveforms. As more load is applied to the spring 130, it increases its frequency (number of wavelengths), again, snapping from one mode to the next. When a threshold of pressure is reached, the spring 130 snaps into a next mode. The increasing load versus displacement is not linear, as in a coil or conventional spring, but exponential. Exponential load handling may be useful in a number of applications, as noted below.

Figure 12:
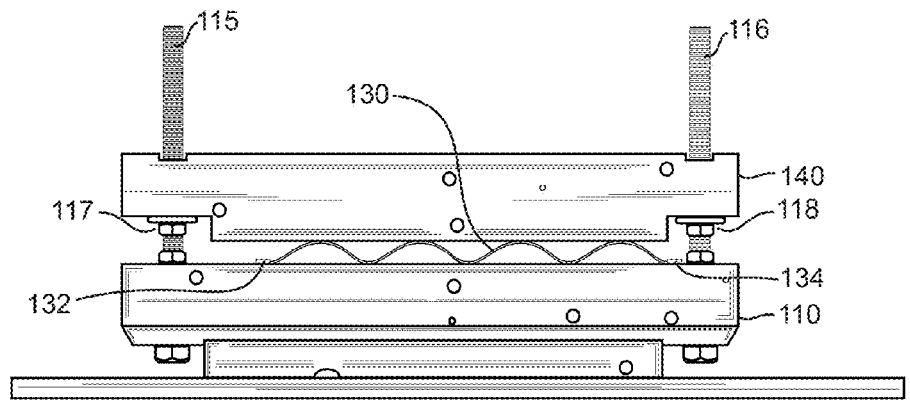
FIG. 12 is a front view of the test cell used in the present invention to demonstrate the operation of the sine wave spring, illustrating the spring material placed on the bed portion and the upper planar member attached, with additional weight (or pressure) applied to the spring to cause it to form four waveforms. Here, the force needed to maintain the system in this stable stat is a small percent of the threshold force.
Figure 13:
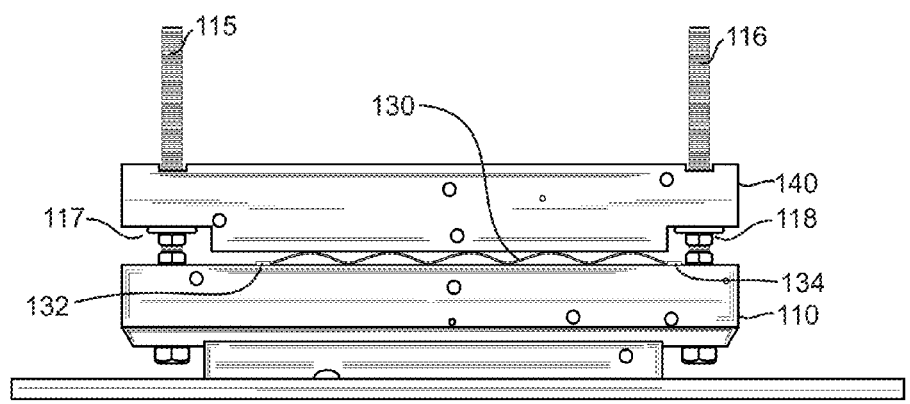
FIG. 13 is a front view of the test cell used in the present invention to demonstrate the operation of the sine wave spring, illustrating the spring material placed on the bed portion and the upper planar member attached, with additional weight (or pressure) applied to the spring to cause it to form five waveforms. Here, the force needed to maintain the system in this stable stat is a small percent of the threshold force.

FIG. 12 is a front view of the test cell used in the present invention to demonstrate the operation of the sine wave spring 130, illustrating the spring material 130 placed on the bed portion 110 and the upper planar member 140 attached, with additional weight (or pressure) applied to the spring 130 to cause it to form four waveforms. Again, the flexible sheet 130 "snaps" to this next mode. The transition from the mode of FIG. 11 to FIG. 12 may be sudden, with the spring 130 snapping into a new shape after a predetermined threshold load is applied. FIG. 13 is a front view of the test cell used in the present invention to demonstrate the operation of the sine wave spring 130, illustrating the spring material 130 placed on the bed portion 110 and the upper planar member 140 attached, with additional weight (or pressure) applied to the spring 130 to cause it to form five waveforms. As more load is applied, the spring 130 creates more wavelengths.

Figure 14:
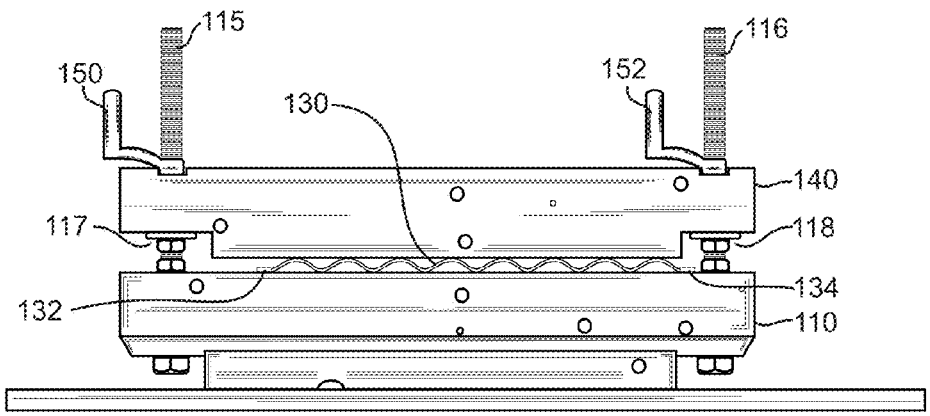
FIG. 14 is a front view of the test cell used in the present invention to demonstrate the operation of the sine wave spring, illustrating the spring material placed on the bed portion and the upper planar member attached, with additional weight (or pressure) applied to the spring to cause it to form eight waveforms. Here, the force needed to maintain the system in this stable stat is a small percent of the threshold force.
Figure 15:
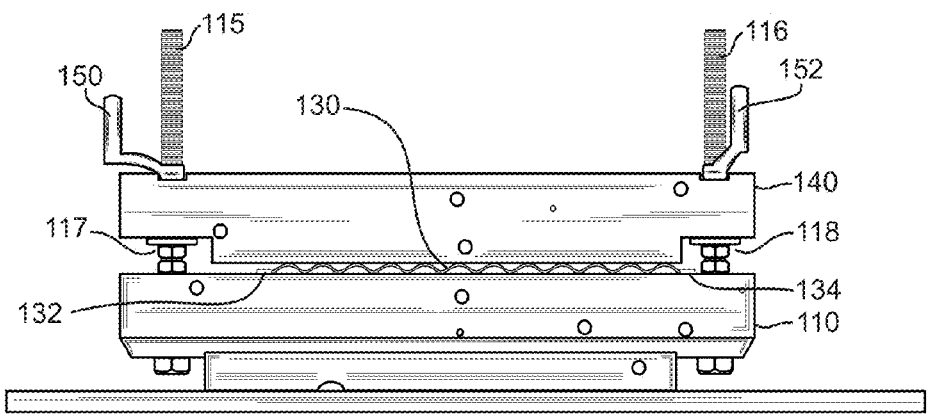
FIG. 15 is a front view of the test cell used in the present invention to demonstrate the operation of the sine wave spring, illustrating the spring material placed on the bed portion and the upper planar member attached, with additional weight (or pressure) applied to the spring to cause it to form twelve waveforms. Here, the force needed to maintain the system in this stable stat is a small percent of the threshold force.

FIG. 14 is a front view of the test cell used in the present invention to demonstrate the operation of the sine wave spring 130, illustrating the spring material 130 placed on the bed portion 110 and the upper planar member 140 attached, with additional weight (or pressure) applied to the spring 130 to cause it to form eight waveforms. For testing purposes, threaded handles 150, 152 may be applied to the threaded rods 115, 116 to provide additional pressure as shown. In an actual spring product, such threaded handles 150, 152 may not be used. FIG. 15 is a front view of the test cell used in the present invention to demonstrate the operation of the sine wave spring 130, illustrating the spring material 130 placed on the bed portion 110 and the upper planar member 140 attached, with additional weight (or pressure) applied to the spring 130 to cause it to form twelve waveforms. As FIGS. 14 and 15 illustrate, the spring 130 can compress in this manner, snapping from one mode to the next. And in each mode, it forms a near-perfect sine wave, as illustrated in the Figures. In FIG. 14, threaded handles 150, 152 were used to provide additional load to the device, in addition to the weight of the concrete top plate 140.

It should be noted that while FIGS. 7-15 illustrate the steps in compressing the spring 130, the spring 130 will also decompress in the reverse manner as pressure is removed. The material is not pushed past its yield strength or creased. The recoil force is only a small percent of the force used to compress it. Thus, the spring 130 is reusable, time and time again, and will return to its original shape once force, pressure, or weight is removed. Note also that the spring rate can be altered through choice of materials, thickness of the spring material, and size (area) of the spring materials, among other variables.

The device as illustrated in FIGS. 7-15 is a proof-of-concept of how the invention works, and not necessarily a practical embodiment of the present invention for regular use. However, the apparatus demonstrated in FIGS. 7-15 may be suitably productized for a number of applications where a non-linear (exponential spring rate) spring is required in a compact area. FIGS. 16-27 illustrate a number of exemplary embodiments where the spring of the present invention may be applied.

Figure 16:
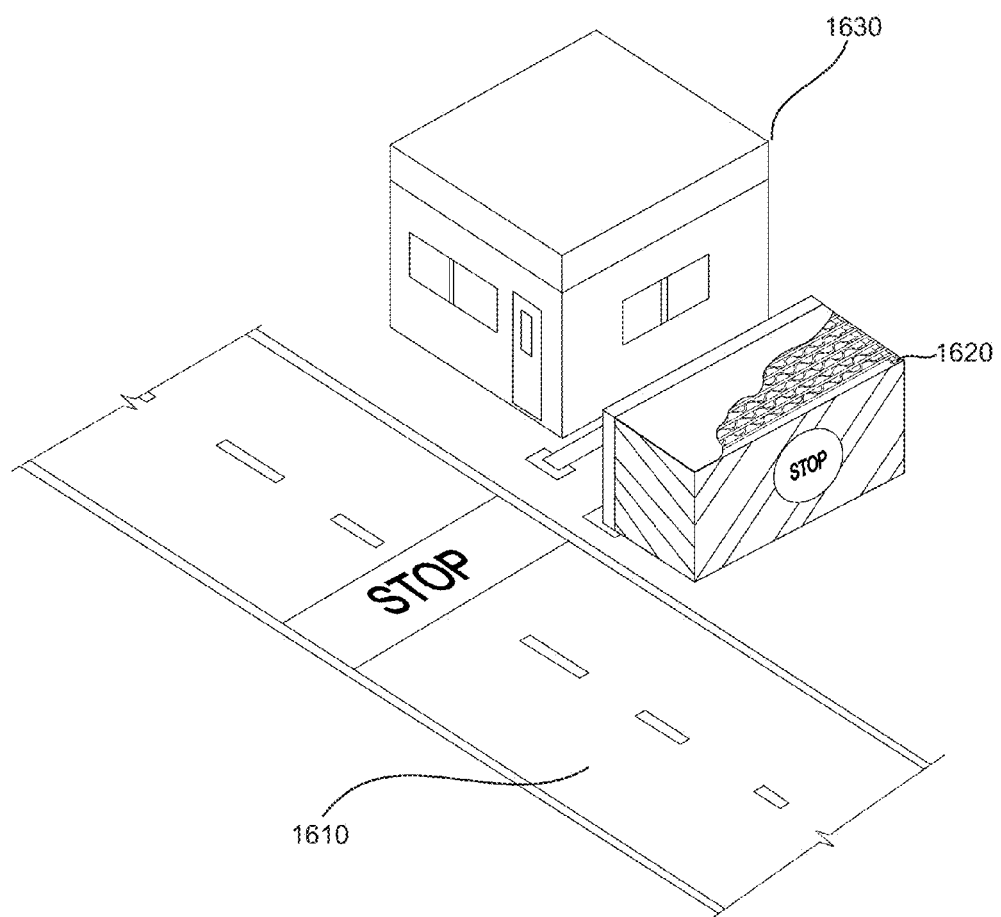
FIG. 16 is a perspective view of one application of the present invention, for use as a crash attenuation or blast barrier.

FIG. 16 is a perspective view of one application of the present invention, for use as a crash or blast barrier 1620. Such barriers may be utilized in areas where vehicles travel near buildings 1630 and the like. For example, as illustrated in FIG. 16, the barrier 1620 may be placed adjacent a roadway 1610, ahead of a toll booth or guardhouse 1630, to prevent errant vehicles from crashing into the toll booth or guard house 1630.

The spring used in the barrier 1620 may comprise a number of large springs formed in sheets, in layers, providing additional compression. The large number of springs and the exponential spring rate of these springs can provide a far superior amount of energy absorption than conventional coil springs or other barrier devices (water or sand barrels). As a bonus, since the springs of the present invention spring back to their original position, the device is reusable, even after an impact with a vehicle. Thus, unlike water or sand barrels, or destructive absorption barriers, the device of the present invention may survive an impact with a vehicle and automatically spring back to its original position after an impact.

Figure 17:
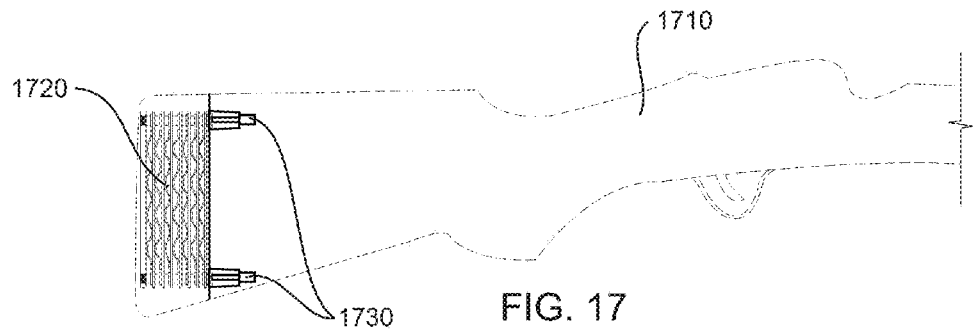
FIG. 17 is a perspective view of one application of the present invention, for use as a compact gun stock recoil reduction system.

FIG. 17 is a perspective view of one application of the present invention, for use as a compact gun stock recoil reduction system. Recoil from a rifle 1710 or other weapon may be difficult to cushion. Traditional Prior Art approaches use linear rate springs, which are bulky and also recoil linearly with the force applied from firing. The springs of the present invention, applied as a pack 1720 in butt of the rifle 1710 as shown in FIG. 17, form a compact and lightweight assembly that can be readily and attractively packaged into the butt of a rifle or other weapon 1710. Moreover, since the spring rate is non-linear, the force from firing will be absorbed in a non-linear manner—as the weapon 1710 is displaced rearward, the spring constant increases exponentially. This exponential spring constant may provide increased accuracy and better shock absorption for the shooter. Spring pack 1720 may be provided with sliding rods 1730 which may mount the pack to the butt of rifle or weapon 1710, which in turn may be provided with recesses to allow the sliding rods to move inwardly with the compression of spring pack 1720.

Figure 18:
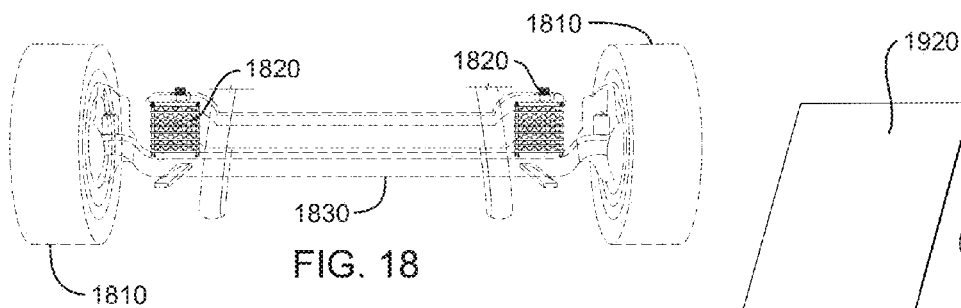
FIG. 18 is a perspective view of one application of the present invention, for use in an automotive self-dampening suspension system.

FIG. 18 is a perspective view of one application of the present invention, for use in an automotive suspension. Automotive suspensions today typically use coil springs, as leaf springs and even torsion bars have fallen from favor. Most modern cars use McPherson struts with coil springs, which are bulky and tall, thus dictating high hood heights and poor aerodynamics. In addition, such a construction requires a lot of space, which is impractical in many designs. For example, in delivery trucks, busses, and Recreational Vehicles, a low load floor may be desirable from an operational standpoint. However, most Prior Art designs require a fairly high load floor, as the vehicle must not only sit above the axle assembly, but also provide adequate height for the spring assembly as well.

The present invention solves this problem by providing a compact spring 1820 with a non-linear rate. It is this second feature that is also of interest to suspension designers. Most automotive coil springs are wound in a non-uniform manner, in an attempt to create a non-linear spring rate from a linear spring. The present invention, by being inherently non-linear (but rather exponential) in its spring rate, requires no such design gymnastics to achieve what is a desired spring rate design for automotive suspension use. Also, the self dampening effect may eliminate the need for shock absorbers (spring dampeners) as found in most vehicles suspension systems.

In FIG. 18, which is a simplified diagram, wheels and tires 1810 are attached to an axle 1830 (here shown as a solid drop-axle) which in turn uses two sine wave spring packs 1820 of the present invention to suspend a vehicle frame. Other types of suspension designs may be used within the spirit and scope of the present invention, with the present spring design, including, but not limited to, McPherson strut, dual control arms, live axle, drop axle, twin I-beam, trailing arm, and the like.

Figure 19:
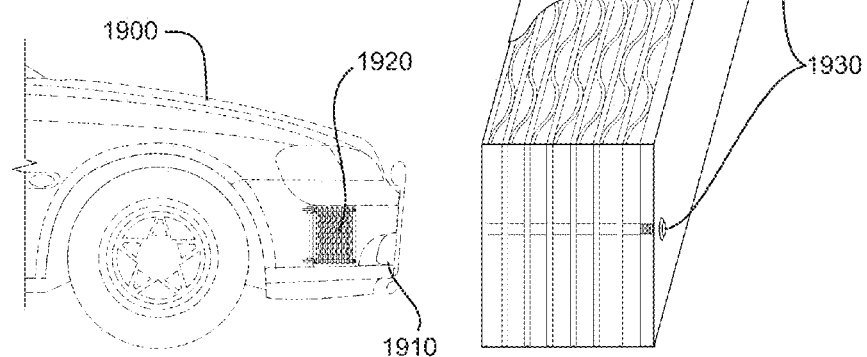
FIG. 19 is a perspective view of one application of the present invention, for use as a spring in an energy absorbent bumper. The inset shows an enlarged view of this spring.
Figure 20:
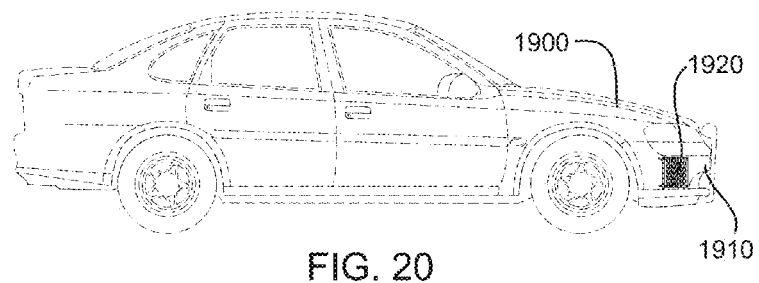
FIG. 20 is another perspective view of one application of the present invention, for use as a spring in an energy absorbent bumper.

FIG. 19 is a perspective view of one application of the present invention, for use as a spring 1920 in an energy absorbent bumper 1910. The inset shows an enlarged view of this spring 1920. FIG. 20 is another perspective view of this application of the present invention, for use as a spring 1920 in an energy absorbent bumper 1910. Automotive bumpers are required by law in many countries to survive impacts of 2.5 to 5 miles per hour, without damage. Traditional techniques for providing such protection have proven to be heavy and awkward. Automakers petitioned the government for relief from the 5 mph standard, on the grounds that the physics involved made the resulting cars too heavy and thus less-fuel efficient. And given the types of impact absorbing systems used, it is not hard to understand why. Heavy steel beams, hydraulic shock absorbers, and springs meant that 100-300 lbs of weight were added to each end of the car—at a location that was least desirable from a weight/balance standpoint.

The present invention, in contrast, provides a spring pack 1910 that can be shaped to the form of the bumper 1910, and is lightweight and can be made of plastic. Moreover, since it recovers its shape once pressure is removed, the resulting bumper will "bounce back" from minor collisions. As illustrated in FIGS. 19-20, the vehicle 1900 may be provided with a spring pack 1920 comprising a number of layers of sine wave spring elements provided in layers and held under initial tension using sliding through bolts 1930 or the like. When the bumper 1910 impacts with an object, the force of impact is transferred to the spring pack 1920, which compresses, causing the spring elements to increase in frequency (form more wavelengths) as the spring pack 1920 compresses. The sliding through-bolts 1930 may project through one end of the pack 1920 into a corresponding recessed area. Once pressure is removed from the bumper 1910, the spring pack 1920 will rebound to its original shape, as confined by the sliding through-bolts 1930. The spring pack 1920 may be coupled to the bumper fascia 1910 using appropriate mechanical links, or alternatively, the spring pack 1920 may be formed in the shape of the bumper 1910, with a urethane bumper fascia mounted over the spring pack 1920.

Figure 21:
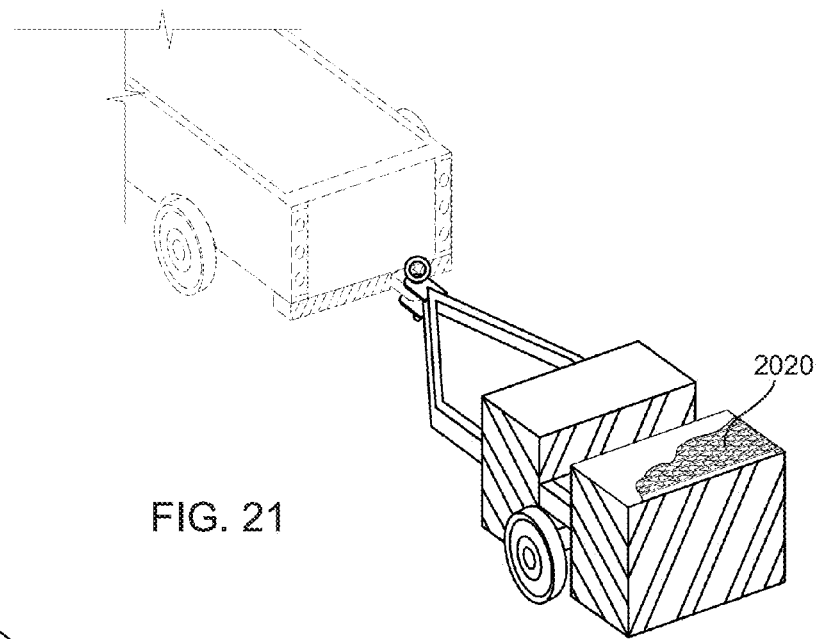
FIG. 21 is a perspective view of one application of the present invention, for use as a portable crash barrier for highway use.
Figure 22:
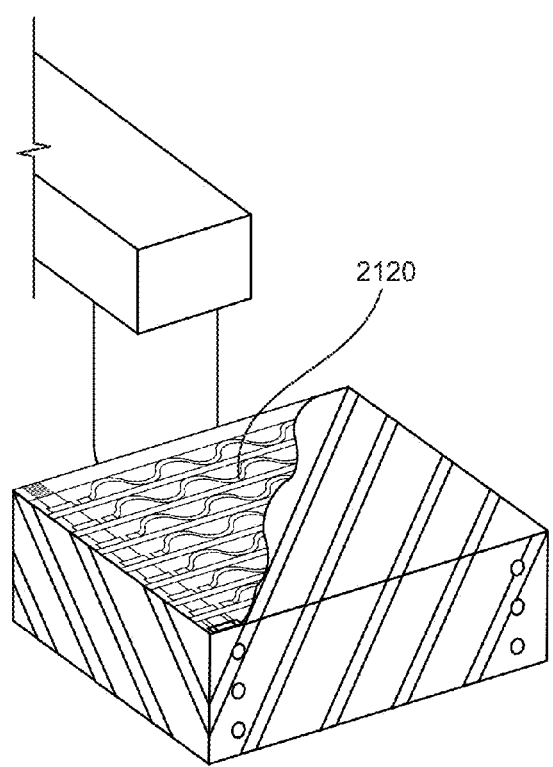

FIG. 21 is a perspective view of one application of the present invention, for use as a portable crash barrier for highway use, mounted to a vehicle or trailer 2100. FIG. 22 is a perspective view of one application of the present invention, for use as a crash barrier for a highway guard rail 2220 or the like. In both FIGS. 21 and 22, a crash barrier 2120, 2220 may be formed from a number of layers of sine wave springs separated by planar surfaces and held together with slide mechanisms to keep the entire package under initial tension. As in the embodiment of FIG. 16, such a crash barrier may be lightweight and readily deployable, and also inexpensive to construct. In addition, since the barrier rebounds to its initial shape, there is no need to replace the barrier once an impact has occurred (unless the impact exceeds the shock absorption capability of the barrier) as the barrier will rebound to its original shape.

Figure 23:
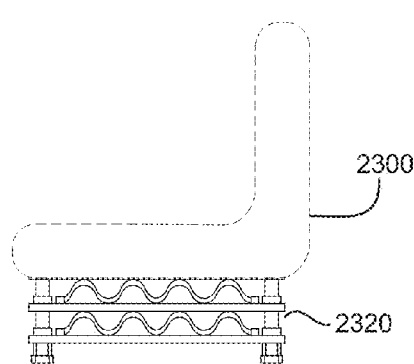

FIG. 23 is a perspective view of one application of the present invention, for use as spring seat support for a vehicle or the like. In this embodiment, a support for a vehicle seat 2300, particularly for an off-road vehicle, military vehicle, or other vehicle experiencing large impacts and shocks to the driver (e.g., dirt bike or the like) is provided. The support may include one or more layers of sine wave springs 2320 of the present invention, pre-stressed in an initial configuration using sliding retaining members as in other embodiments. When the vehicle travels over a bump, the sine wave springs 2320 may compress initially, and then rebound. Fine-tuning of the seat springs 2320 (or springs in any of the applications noted herein) may be achieved by altering the thickness or material type of the flexible members used for the sine wave springs. Multiple layers of differing thickness or materials may be used so as to provide tailor-made spring rates for different applications. Due to the self-dampening nature of the sine wave spring, oscillations are not as prevalent as with traditional leaf, coil, and torsion bar springs.

Figure 24:
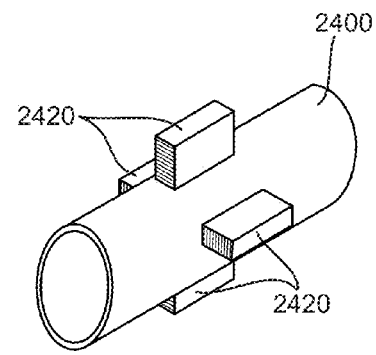
FIG. 24 is a perspective view of one application of the present invention, for use as a pipe support.
Figure 25:
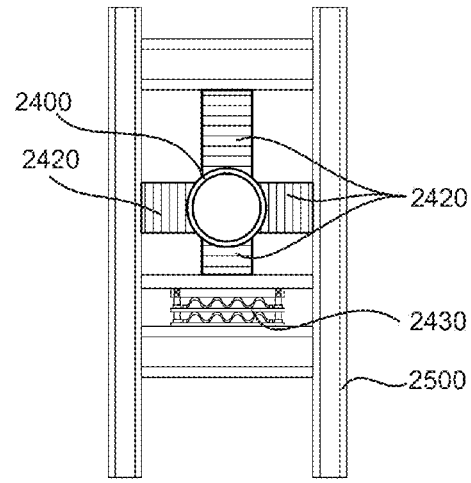
FIG. 25 is a cross-sectional view of the embodiment of FIG. 24.

FIG. 24 is a perspective view of one application of the present invention, for use as a pipe support. FIG. 25 is a cross-sectional view of the embodiment of FIG. 24. In this embodiment, a support for a pipe 2400, as in an industrial complex, oil or natural gas pipeline, or the like, may be provided by using one or more sine wave springs 2420 or spring packs of the present invention. The spring packs 2420 cushion the pipeline from shock, which reduces the incidence of stress cracking and the like. The spring packs 2420 also absorb vibrations and accommodate expansion and contraction of pipes with temperature and the like. The spring packs 2420 may dampen oscillations due to earthquakes and the like as well. In addition to spring packs 2420, a support spring 2430 may be provided to mount the assembly to a frame 2500 and provide additional cushioning for the pipe 2400. This spring arrangement may be particularly useful in preventing pipeline spills due to stress cracking and the like induced by solid or rigid pipe mounts.

Figure 26:
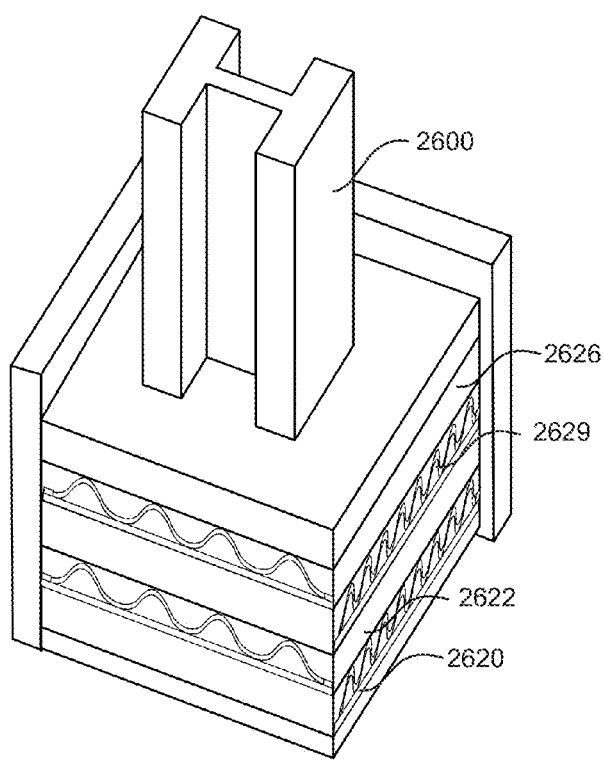
FIG. 26 is a perspective view of one application of the present invention, for use as beam or column support.

FIG. 26 is a perspective view of another application of the present invention, for use as beam or column support. In this application, a support column 2600 may be supported by a number of spring packs 2620, 2622, 2624, and 2626, separated by solid layers and/or laid at 90 degree orientations to one another. Such a support may be used to dampen vibrations and provide a stable platform for instrumentation or the like, or as a means of absorbing shocks to a building structure in the event of a earthquake or the like.

The apparatus of FIG. 26 may also be utilized to build a scale, such as a truck scale or the like. A stacked sandwich of sine wave springs may be constructed as a spring pack in the manner of FIG. 26 or FIG. 27, and built into a truck scale platform. When the wheel of the vehicle is placed over the spring pack, it will compress in the manner discussed above, in response to the weight applied. The amount of displacement of the spring pack will be indicative of the load applied, and a simple displacement transducer (or even visual indicator) can indicate how much weight is present. In a portable embodiment, a simple flat plate design may be used with one or two layers of sine wave springs configured to be drive over by a vehicle for a go/no-go type of weight check. If the sine wave morphs to a next mode, the user may see the sine wave change state and also hear an audible "crack" noise as the state changes, indicating that the wheel load is over a predetermined limit.

Figure 27:
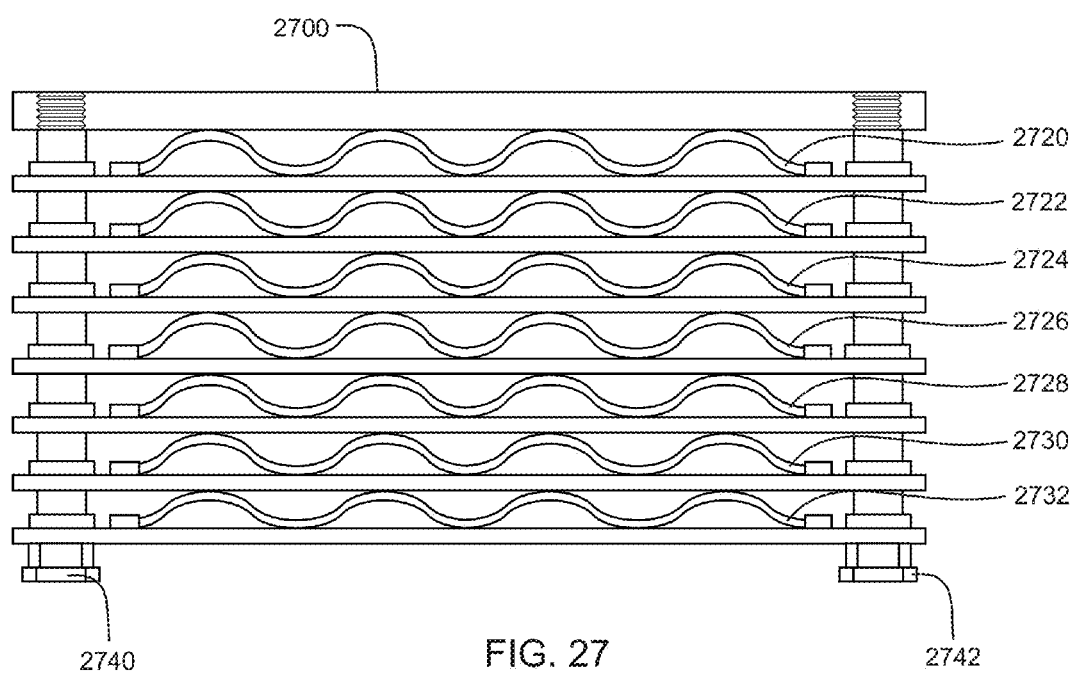
FIG. 27 is a perspective view of one application of the present invention, illustrating how the springs may be stacked for additional capacity and load rating.

FIG. 27 is a perspective view of one application of the present invention, illustrating how the springs may be stacked for additional capacity and load rating. The construction of the spring pack of FIG. 27 may be applied to one or more of the embodiments illustrated above. The spring pack of FIG. 27 may comprise a number of layers of sine wave springs 2720, 2722, 2724, 2726, 2728, 2730, and 2732, separated by substantially planar plates. The entire assembly is held in initial tension between upper and lower platens 2700, which are held together with slide columns 2740, 2742, as illustrated. When weight, pressure, or force is applied to one side of the spring pack (e.g., bottom side, in FIG. 27) the sine wave springs 2720, 2722, 2724, 2726, 2728, 2730, and 2732 may compress as illustrated in FIGS. 7-15 above, and the planar plates may slide upward on the slide columns 2740, 2742. When the pressure, weight, or force is removed, the device returns to its initial state.

Again, the spring rate may be varied or tailored by altering the thickness of the flexible material in the springs, or the material type or number of springs. In addition, different layers may be provided with different material thickness or surface area or material type, to provide different spring rates for different layers, which taken in combination with other layers, can provide a tailored spring rate for differing applications. Shock absorption may also be applied, for example, by providing hydraulic dampening with the slide columns or using frictional shock absorption on the sliding columns themselves.

Figure 28:
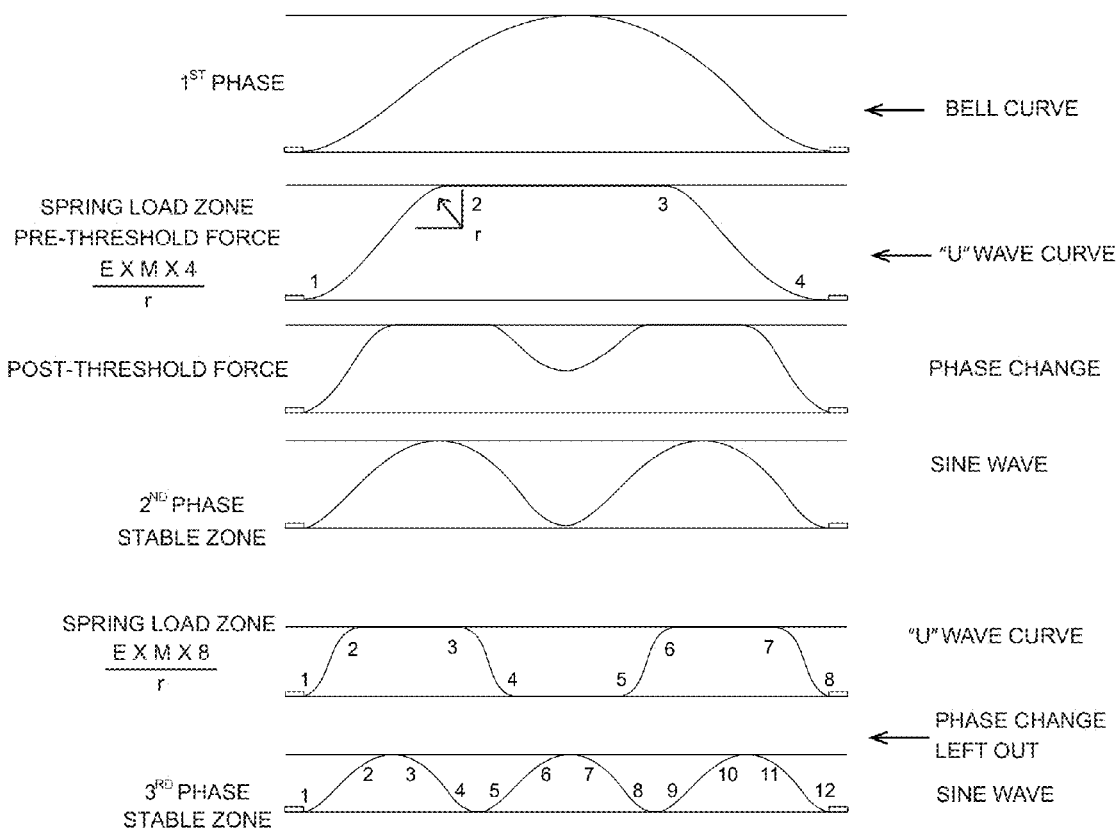
FIG. 28 is a diagram illustrating the physics involved in the transition of the sine wave spring between states.

FIG. 28 is a diagram illustrating the physics involved in the transition of the sine wave spring between states. The diagram of FIG. 28 is schematic in nature and describes how the sine wave spring of the present invention works. In the top diagram of FIG. 28, the sine wave spring is in its initial, or first phase, with little or no pressure applied to it. In the second diagram, as pressure is applied, the sine wave shape flattens into a U-shaped curve. The force on the spring can be calculated using the formula F=(E×m×n)/r, where F is the force or load on the spring, r is a facto based on the radius of curvature of the shoulders (as illustrated in FIG. 28), n is the total number of "node shoulders" per phase as illustrated in FIG. 28 (n=four shoulders in the second diagram example), m is a factor based on the thickness and width of the material used, and E is Young's modulus of elasticity, in psi.

In the third diagram, a phase change starts to commence as force is applied to the spring in a vertical direction. In actual application, this phase change would appear to be almost instantaneous, and high-speed photography would probably be required to capture the image in the third diagram of FIG. 28. In the fourth diagram, the spring has morphed into a second phase. As more force is applied, another phase change starts as illustrated in the fifth diagram of FIG. 28, where n=8. After subsequent phase changes (not shown), the spring appears as in the sixth diagram of FIG. 28, with a total of 12 node shoulders (n=12). The force required to keep the core material in this stable state is found empirically to be a small percent of the threshold force used to convert the system to the higher phase.

Figure 29:
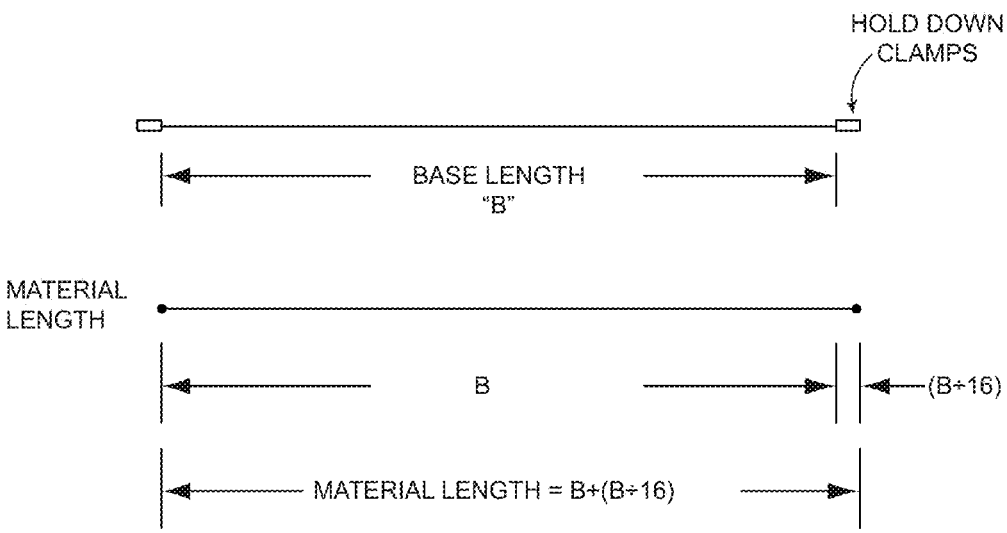
FIG. 29 is a diagram illustrating the relationship between the material length and the clamp size in the sine wave spring of the present invention.

FIG. 29 is a diagram illustrating the relationship between the material length and the clamp size in the sine wave spring of the present invention. The base plate or platen holding the spring material in place may be provided with hold-down clamps or other devices to hold the end of the flexible material, while the rest of the flexible material remains free. If the hold-down clamps are spaced a distance $B_{Fix}$ apart, the flexible material should be longer than $B_{Fix}$ in order to form the sine wave spring. In the preferred embodiment, the flexible material should have a optimal length $B_{Mat}$ substantially equal to $B_{Fix}+B_{Fix}\times 0.0625$ or one and one-sixteenths $B_{Fix}$.

Of course, other dimensions may be used without departing from the spirit and scope of the present invention. As previously noted, the core material should optimally have a length $B_{Mat}$ substantially equal to $B_{Fix}+B_{Fix}\times 0.0625$, but can be less than this value (but obviously, greater than $B_{Fix}$). If the material is greater in length than $B_{Fix}+B_{Fix}\times 0.0625$, it has been determined empirically that the device generally doesn't work. When the flexible material is cut very small (but greater than $B_{Fix}$) the separation of the platens becomes very small, which limits the range of the spring, which may not be practical for many of the applications discussed above.

Figure 30:
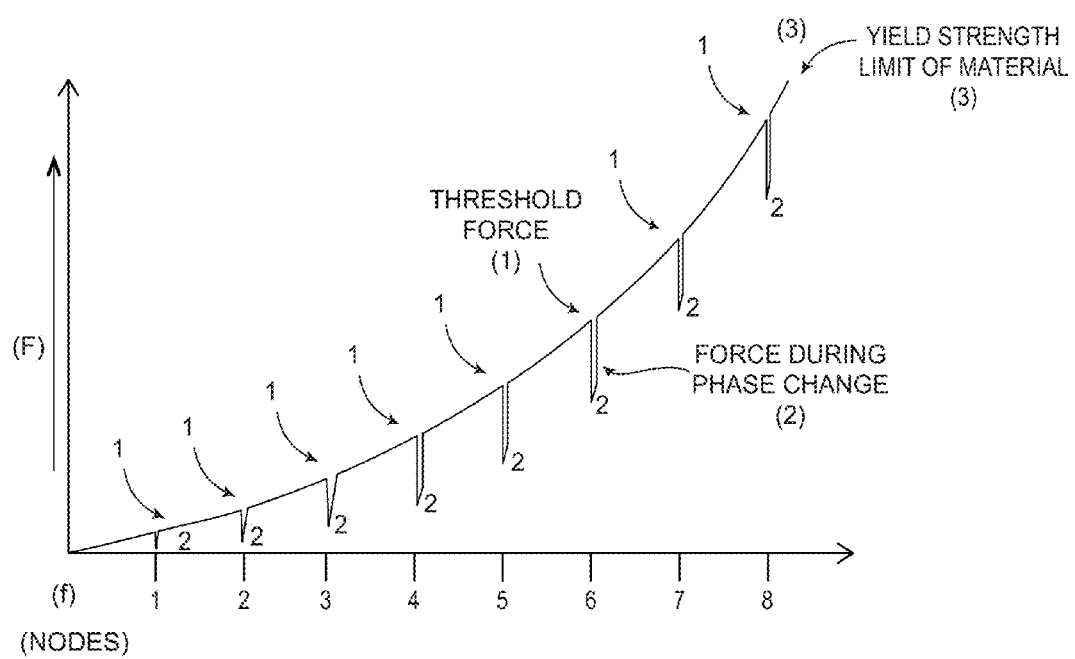
FIG. 30 is a plot of force versus displacement for the sine wave spring of the present invention, illustrating the exponential spring constant of the sine wave spring.

FIG. 30 is a plot of force versus displacement for the sine wave spring of the present invention, illustrating the exponential spring constant of the sine wave spring. In FIG. 30, the Y-axis of the chart shows force, while the X-axis shows the distance compressed, here represented by the node values of the sine wave (as the sine wave spring morphs to subsequent node values, the distance of compression increases. As illustrated in the diagram, the overall spring constant of the sine wave spring increases exponentially as additional force is applied. In studying the geometry of sine waves, this might be expected, as the height of the sine wave (wave height) decreases in each node morphing in an inverse exponential manner.

Of course, the spring material cannot be compressed indefinitely. Once the yield strength of the flexible material making up the sine wave spring is reached, the spring may fail, as illustrated the graph. This is also a problem for conventional coil, leaf, or torsion bar springs, which may fail when overloaded as well. One way of preventing such failure in operation is to place a stop between the platen and upper plate, such that when the node before the failure point is reached, the upper plate will "bottom out" on the stop on the platen, preventing the spring from failing under load.

Figure 31:
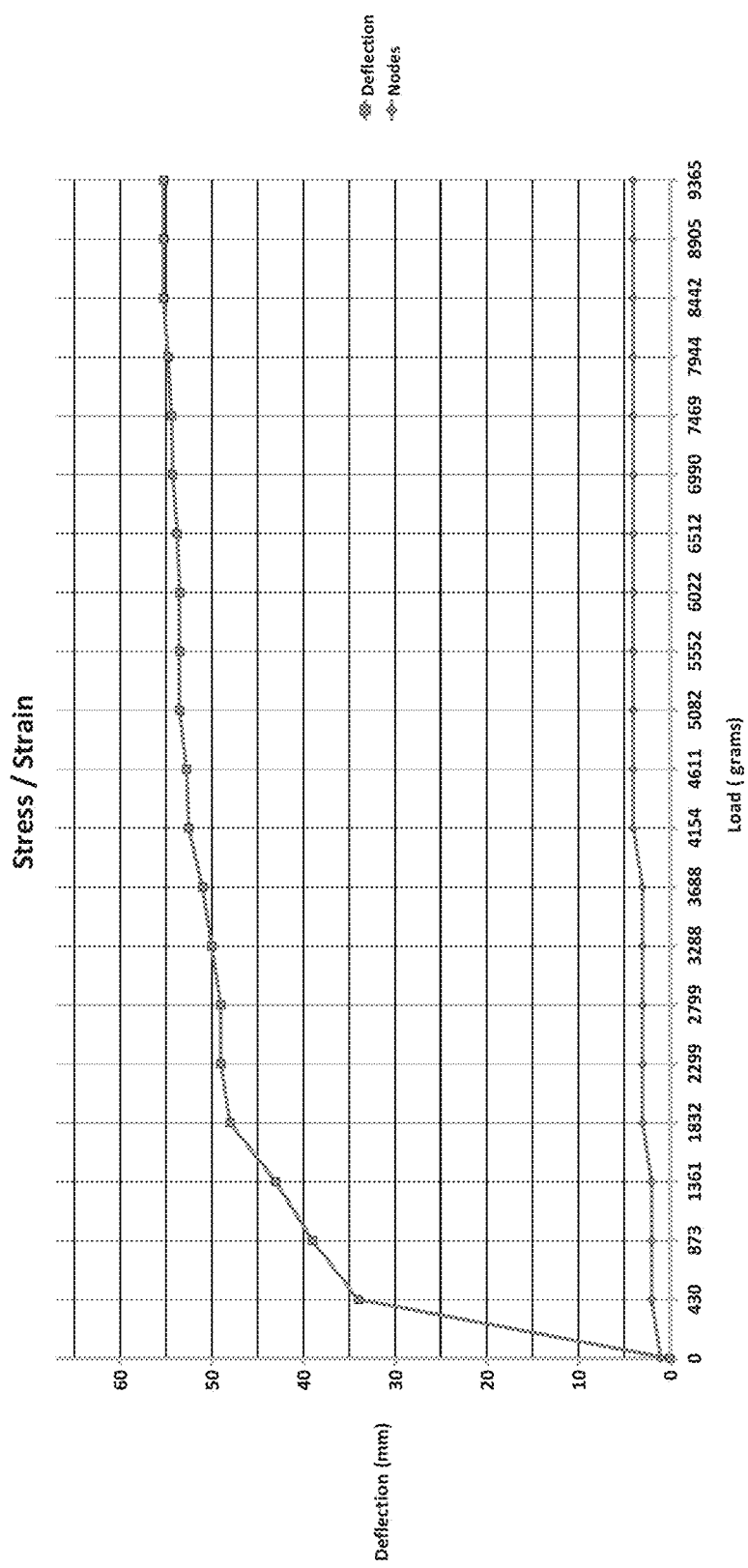
FIG. 31 is a graph illustrating the relationship between deflection and load in a first test of the sine wave spring of the present invention.

FIG. 31 is a graph illustrating the relationship between deflection and load in a first test of the sine wave spring of the present invention. In this first test, a sheet of 0.020" Mylar measuring 17" ($B_{Mat}$) in length ($B_{Mat}=B_{Fix}+B_{Fix}\times 0.0625$) by 4" wide, was used. A fixture having a base length $B_{Fix}$ of 16" was used. The original height of the spring at node 1, was 67 mm. Table 1 illustrates the data plotted in FIG. 31.

TABLE 1

| Added Load | Total Load | Nodes | Deflection | Original Height | Height Under Load | Measurements | | |
|---|---|---|---|---|---|---|---|---|
| 0 | 0 | 1 | 0 | 67 | 67 | 67 | | |
| 430 | 430 | 2 | 34 | 67 | 33 | 33 | | |
| 443 | 873 | 2 | 39 | 67 | 28 | 28 | | |
| 488 | 1361 | 2 | 43 | 67 | 24 | 24 | | |
| 471 | 1832 | 3 | 48 | 67 | 19 | 19 | | |
| 467 | 2299 | 3 | 49 | 67 | 18 | 18 | | |
| 500 | 2799 | 3 | 49 | 67 | 18 | | 18 | |
| 489 | 3288 | 3 | 50 | 67 | 17 | 16 | 18 | |
| 400 | 3688 | 3 | 51 | 67 | 16 | 17 | 15 | |
| 466 | 4154 | 4 | 52.5 | 67 | 14.5 | 14 | 15 | |
| 457 | 4611 | 4 | 52.75 | 67 | 14.25 | 13.5 | 15 | |
| 471 | 5082 | 4 | 53.5 | 67 | 13.5 | 13 | 14 | |
| 470 | 5552 | 4 | 53.5 | 67 | 13.5 | 12 | 15 | |
| 470 | 6022 | 4 | 53.5 | 67 | 13.5 | 12 | 15 | |
| 490 | 6512 | 4 | 53.75 | 67 | 13.25 | 12 | 14.5 | |
| 478 | 6990 | 4 | 54.25 | 67 | 12.75 | 11.5 | 14 | |
| 479 | 7469 | 4 | 54.38 | 67 | 12.63 | 14 | 11.25 | |
| 475 | 7944 | 4 | 54.75 | 67 | 12.25 | 13.5 | 11 | |
| 498 | 8442 | 4 | 55.25 | 67 | 11.75 | 13 | 10.5 | |
| 463 | 8905 | 4 | 55.25 | 67 | 11.75 | 13 | 10.5 | |
| 460 | 9365 | 4 | 55.25 | 67 | 11.75 | 13 | 10.5 | |

Figure 32:
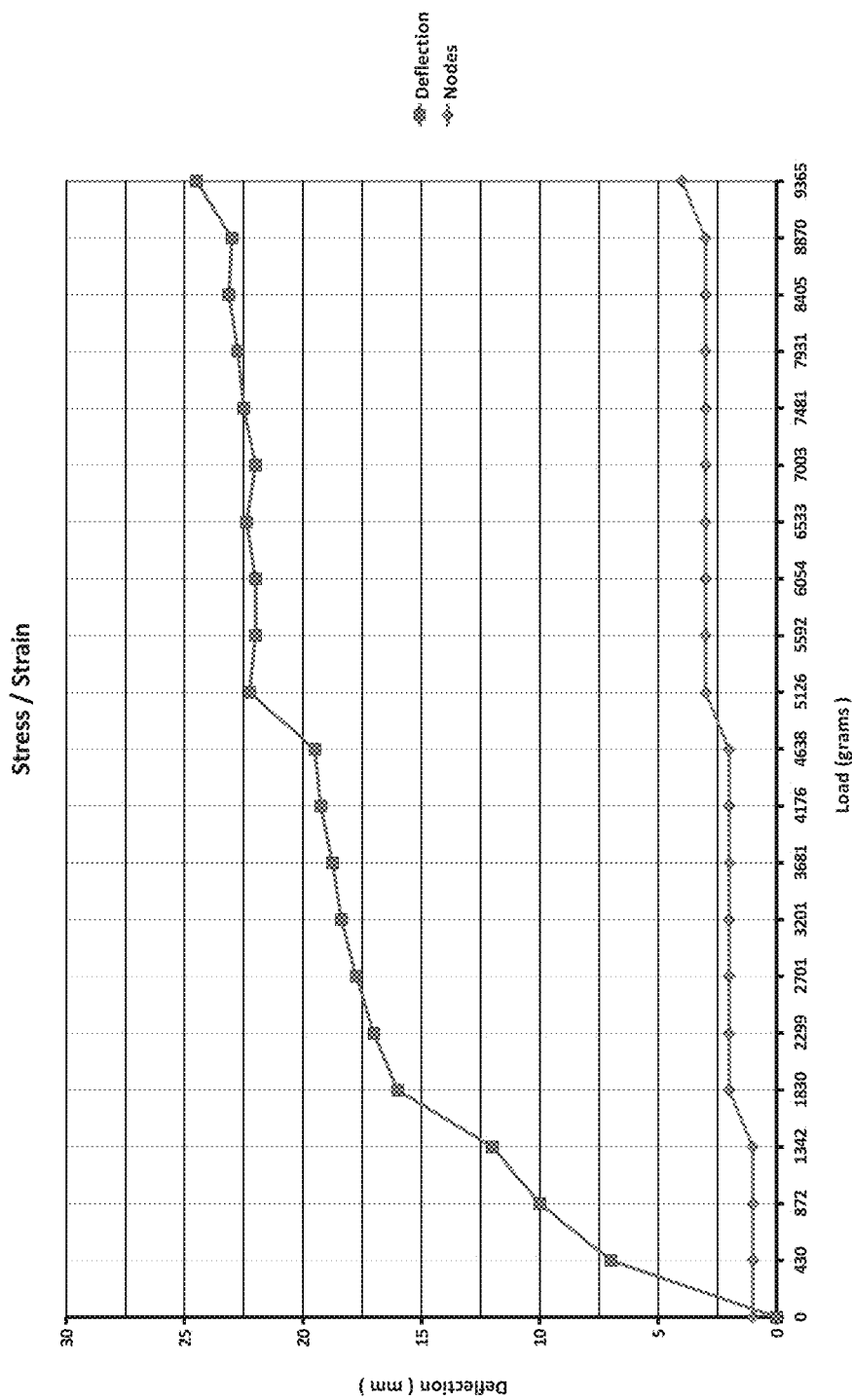
FIG. 32 is a graph illustrating the relationship between deflection and load in a second test of the sine wave spring of the present invention.

FIG. 32 is a graph illustrating the relationship between deflection and load in a second test of the sine wave spring of the present invention. In this second test, a sheet of 0.020" Mylar measuring 8.5" ($B_{Mat}$) in length ($B_{Mat}=B_{Fix}+B_{Fix}\times 0.0625$) by 4" width was used. A fixture having a base length $B_{Fix}$ of 8" was used. The original height of the spring at node 1, was 31 mm. Table 2 illustrates the data plotted in FIG. 32.

TABLE 2

| Added Load | Total Load | Nodes | Deflection | Original Height | Height Under Load | Measurements (mm) | | |
|---|---|---|---|---|---|---|---|---|
| 0 | 0 | 1 | 0 | 31 | 31 | 31 | | |
| 430 | 430 | 1 | 7 | 31 | 24 | 24 | | |
| 442 | 872 | 1 | 10 | 31 | 21 | 21 | | |
| 470 | 1342 | 1 | 12 | 31 | 19 | 19 | | |
| 488 | 1830 | 2 | 16 | 31 | 15 | 15 | | |
| 469 | 2299 | 2 | 17 | 31 | 14 | 14 | | |
| 402 | 2701 | 2 | 17.75 | 31 | 13.25 | 13.25 | | |
| 500 | 3201 | 2 | 18.375 | 31 | 12.625 | 13.25 | 12 | |

TABLE 2-continued

| Added Load | Total Load | Nodes | Deflection | Original Height | Height Under Load | Measurements (mm) | |
|---|---|---|---|---|---|---|---|
| 480 | 3681 | 2 | 18.75 | 31 | 12.25 | 12 | 12.5 |
| 495 | 4176 | 2 | 19.25 | 31 | 11.75 | 12 | 11.5 |
| 462 | 4638 | 2 | 19.5 | 31 | 11.5 | 12 | 11 |
| 488 | 5126 | 3 | 22.25 | 31 | 8.75 | 8.5 | 9 |
| 466 | 5592 | 3 | 22 | 31 | 9 | 9 | 9 |
| 462 | 6054 | 3 | 22 | 31 | 9 | 9 | 9 |
| 479 | 6533 | 3 | 22.375 | 31 | 8.625 | 8.5 | 8.75 |
| 470 | 7003 | 3 | 22 | 31 | 9 | 9 | 9 |
| 478 | 7481 | 3 | 22.5 | 31 | 8.5 | 8.25 | 8.75 |
| 450 | 7931 | 3 | 22.75 | 31 | 8.25 | 8.5 | 8 |
| 474 | 8405 | 3 | 23.125 | 31 | 7.875 | 8.25 | 7.5 |
| 465 | 8870 | 3 | 23 | 31 | 8 | 8 | 8 |
| 495 | 9365 | 4 | 24.5 | 31 | 6.5 | 7 | 6 |

Figure 33:
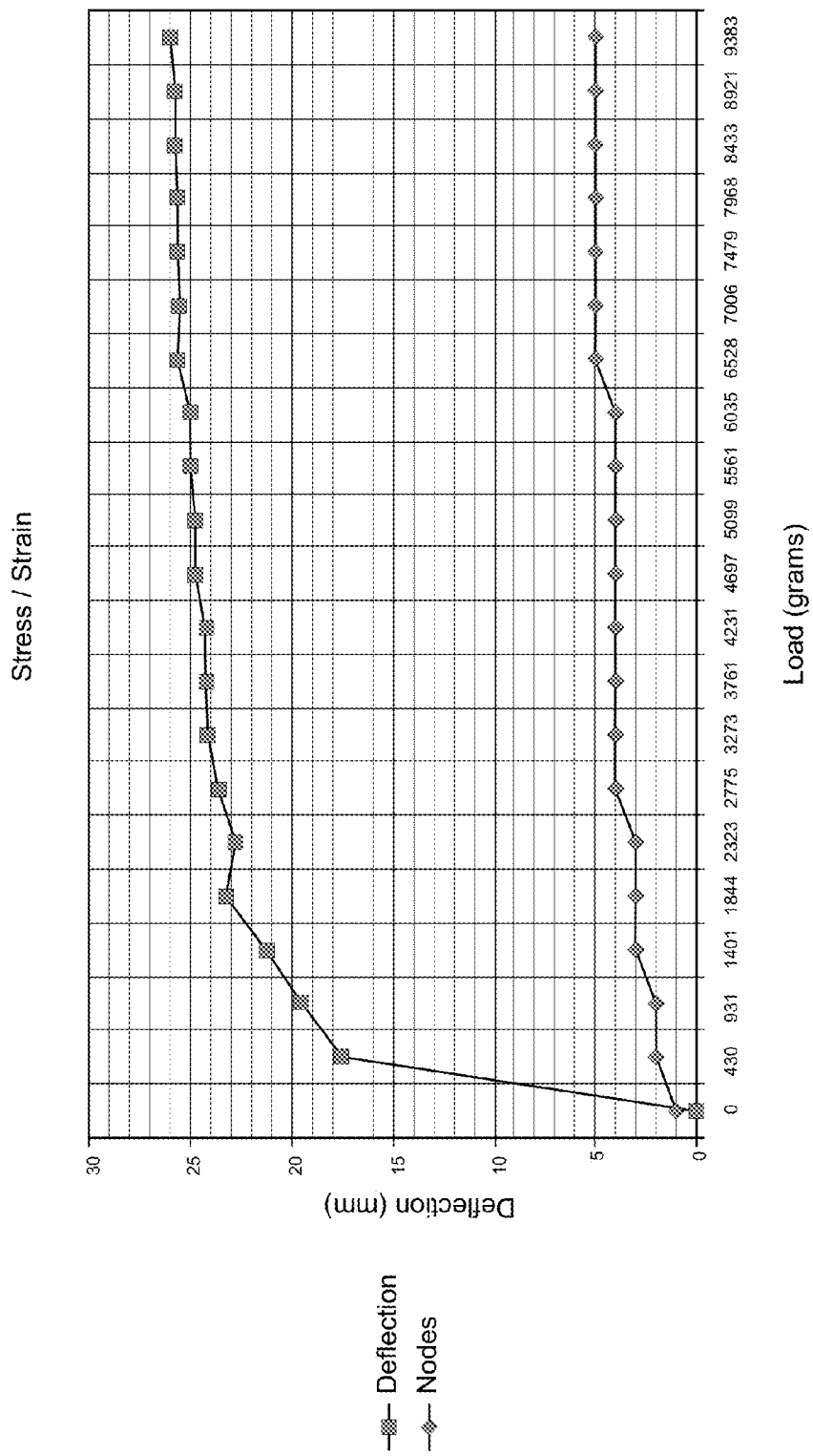
FIG. 33 is a graph illustrating the relationship between deflection and load in a third test of the sine wave spring of the present invention.

FIG. 33 is a graph illustrating the relationship between deflection and load in a third test of the sine wave spring of the present invention. In this third test, a sheet of 0.008" Mylar measuring 8.5" ($B_{Mat}$) in length, ($B_{Mat}=B_{Fix}+B_{Fix}\times 0.0625$) by 4" width, was used. A fixture having a base length $B_{Fix}$ of 8" was used. The original height of the spring at node 1, was 30 mm. Table 3 illustrates the data plotted in FIG. 33.

TABLE 3

| Added load | Total Load | Nodes | Deflection | H | Height Under Load | Measurements | |
|---|---|---|---|---|---|---|---|
| 0 | 0 | 1 | 0 | 30 | 30 | | 30 |
| 430 | 430 | 2 | 17.5 | 30 | 12.5 | | 12.5 |
| 501 | 931 | 2 | 19.5 | 30 | 10.5 | 11 | 10 |
| 470 | 1401 | 3 | 21.25 | 30 | 8.75 | 8 | 9.5 |
| 443 | 1844 | 3 | 23.25 | 30 | 6.75 | 6 | 7.5 |
| 479 | 2323 | 3 | 22.75 | 30 | 7.25 | 7.25 | 7.25 |
| 452 | 2775 | 4 | 23.625 | 30 | 6.375 | 6.5 | 6.25 |
| 498 | 3273 | 4 | 24.125 | 30 | 5.875 | 6.25 | 5.5 |
| 488 | 3761 | 4 | 24.25 | 30 | 5.75 | 6 | 5.5 |
| 470 | 4231 | 4 | 24.25 | 30 | 5.75 | 6 | 5.5 |
| 466 | 4697 | 4 | 24.75 | 30 | 5.25 | 5.25 | 5.25 |
| 402 | 5099 | 4 | 24.75 | 30 | 5.25 | 5.25 | 5.25 |
| 462 | 5561 | 4 | 25 | 30 | 5 | 5 | 5 |
| 474 | 6035 | 4 | 25 | 30 | 5 | 5 | 5 |
| 493 | 6528 | 5 | 25.625 | 30 | 4.375 | 4.5 | 4.25 |
| 478 | 7006 | 5 | 25.5 | 30 | 4.5 | 4.5 | 4.5 |
| 473 | 7479 | 5 | 25.625 | 30 | 4.375 | 4.25 | 4.5 |
| 489 | 7968 | 5 | 25.625 | 30 | 4.375 | 4.25 | 4.5 |
| 467 | 8435 | 5 | 25.75 | 30 | 4.25 | 4 | 4.5 |
| 486 | 8921 | 5 | 25.75 | 30 | 4.25 | 4.25 | 4.25 |
| 462 | 9383 | 5 | 26 | 30 | 4 | 4 | 4 |

The test data in Tables 1-3 and FIGS. 31-33 illustrate the exponential spring rate effect of the present invention. While the spring experiences some deflection from the first to second nodes, the amount of deflection drops off significantly with additional load applied. Exponential spring rates, as discussed above, may be useful in a number of applications. Traditional springs, such as coil and leaf springs tend to provide a more linear spring rate. Such springs can be modified to attempt to provide an exponential spring rate (e.g., varying coil spacing, density, thickness, or adding additional "overload" leaves to a leaf spring) but such solutions do not provide a true exponential spring rate as in the present invention.

Note that in the present invention, a linear sine-wave spring is illustrated. However, other shapes may be used within the spirit and scope of the present invention. For example, a circular shape (disc) may be used, formed into a dome and then compressed into a number of circular, radial nodes. Such alternative shapes may be useful for packaging purposes or in particular applications or to alter the spring rate curve.

For example, in the preferred embodiment as disclosed herein, the length $B_{Mat}$ of the spring material is optimally about $B_{Fix}+B_{Fix}\times 0.0625$, where $B_{Fix}$ is the distance between the spring stops. However, as one of ordinary skill in the art may appreciate, other lengths for $B_{Mat}$ may be used, without departing from the spirit and scope of the present invention, in that the length of $B_{Mat}$ may vary from the formula value of $B_{Fix}+B_{Fix}\times 0.0625$ by some amount, and need not be an exact value. A value which is substantially this amount will also work. The formula of $B_{Mat}=B_{Fix}+B_{Fix}\times 0.0625$ is provided here to illustrate one preferred embodiment ("best mode") of the invention, as reduced to practice, and to illustrate the invention such that one of ordinary skill in the art can make or use the invention without undue experimentation.

In addition, the present inventor has discovered that if the material used for the spring is thin and flimsy (i.e., low modulus) and the fixture is relatively long for that material, then waves may be pre-formed to take up the extra slack and get the process started. There are, therefore, embodiments where a high number of oscillations can take up a lot of material and the length $B_{Mat}$ would be greater than $B_{Fix}+B_{Fix}\times 0.0625$. For high modulus material on short fixtures, one sixteenth might be the greatest length that could be used. Thus, in the general case, the material length $B_{Mat}$ must be greater than the fixture length $B_{Fix}$, whereas the formula $B_{Mat}=B_{Fix}+B_{Fix}\times 0.0625$ represents a special case scenario for certain high modulus materials.

Since the filing of the parent Patent Application, the present inventor has built and tested a number of prototypes of the sine wave spring of the present invention, including a full-scale suspension spring for an automotive trailer, which has been road-tested. As the result of this further research, the present inventor has developed a variation of the present invention encompassing a sine wave spring having a varying height or amplitude. In the preferred embodiment, this may vary linearly, providing a wedge-shape. However, the tested concept illustrates how the sine wave spring may be altered for other shapes as well (e.g., parabolic, hyperbolic, dual wedge, or any combination of shapes).

Figure 34:
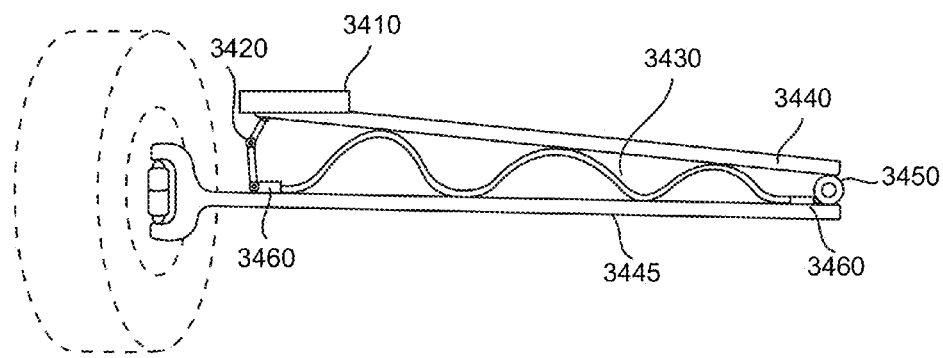
FIG. 34 is a front view of one application of the present invention, for use in an automotive self-dampening suspension system.

FIG. 34 is a front view of one application of the present invention, for use in an automotive self-dampening suspension system. In this embodiment of the present invention, the sine wave spring 3430 has varying amplitude, which varies from a taller outboard portion to a narrower inboard portion. Sine wave spring 3430 may be attached to lower control arm 3445 via stops 3460. In this example the vehicle suspension comprises a lower control arm 3445 and an upper control arm 3440 which may be attached to a vehicle at a pivot point 3450 and at fixed point 3410. A wheel, shown in dashed lines, may be attached, as is known in the art, to lower control arm 3445. Retainer linkage 3420 may be used to maintain alignment of the upper and lower control arms. Other types of mechanisms may be used as known in the suspension arts, without departing from the spirit and scope of the present invention.

Note that the suspension system maintains a very low profile and also has self-damping characteristics. Compared to conventional leaf or coil spring systems, or McPherson struts, the present invention provides a much lower vehicle profile.

Figure 35:
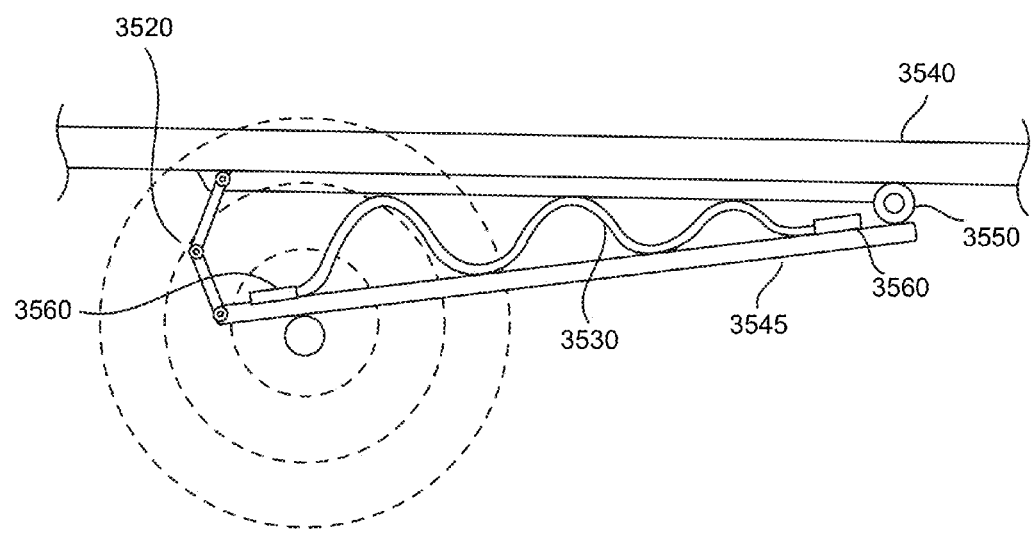
FIG. 35 is a side view of another application of the present invention, for use in an automotive self-dampening suspension system, such as for a trailer suspension.

FIG. 35 is a side view of another application of the present invention, for use in an automotive self-dampening suspension system, such as for a trailer suspension. In this embodiment, a trailing-arm type suspension is used, with trailing arm 3545 attached to frame member 3540 at pivot point 3550. Sine wave spring 3530 may be attached to lower trailing arm 3545 via stops 3560. In this embodiment of the present invention, the sine wave spring 3530 has varying amplitude, which varies from a taller rearward portion to a narrower forward portion. A wheel, shown in dashed lines, may be attached, as is known in the art, to lower trailing arm 3544. Retainer linkage 3520 may be used to maintain alignment of the trailing arm with frame 3540. Other types of mechanisms may be used as known in the suspension arts, without departing from the spirit and scope of the present invention.

Figure 43:
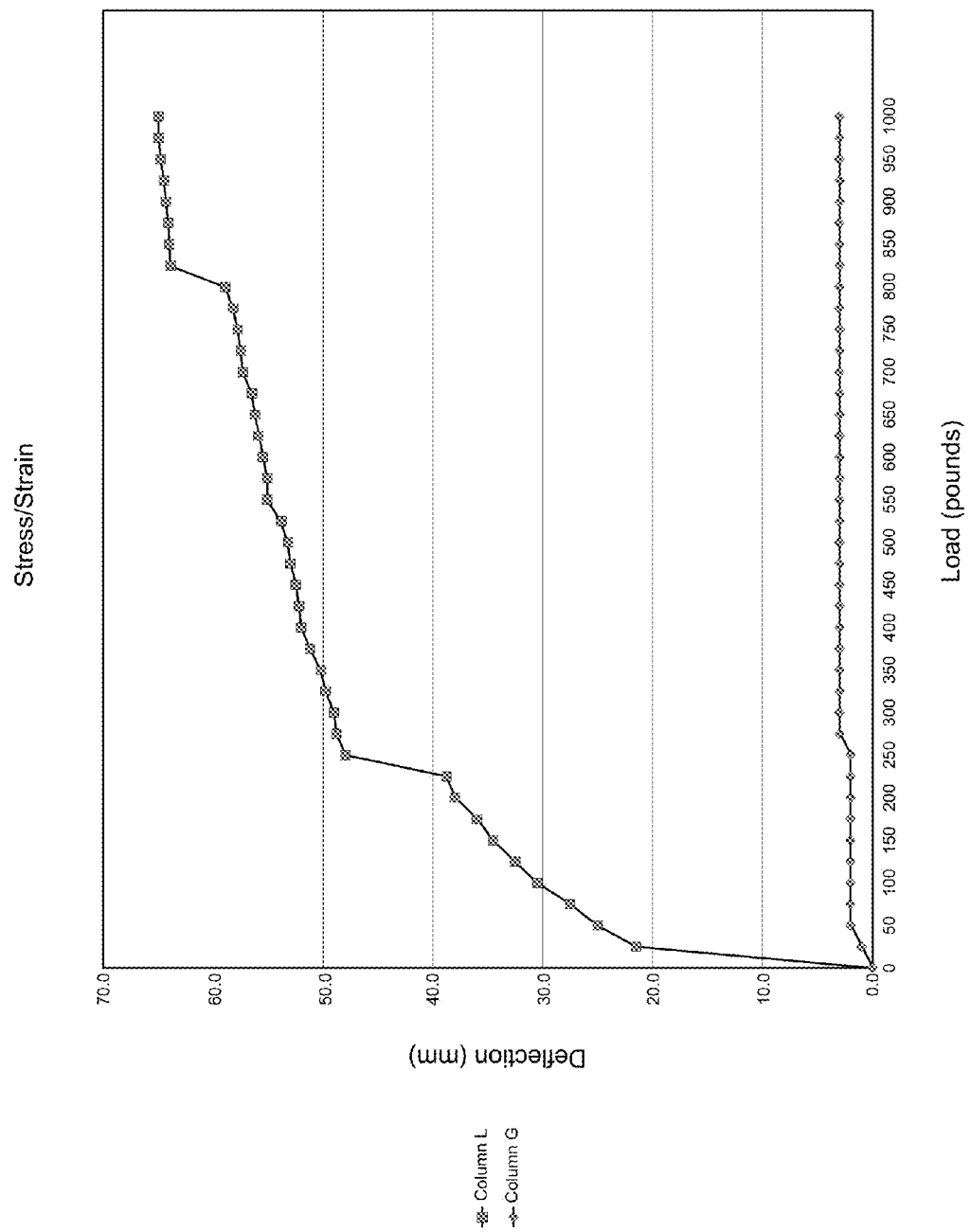
Figure 44:
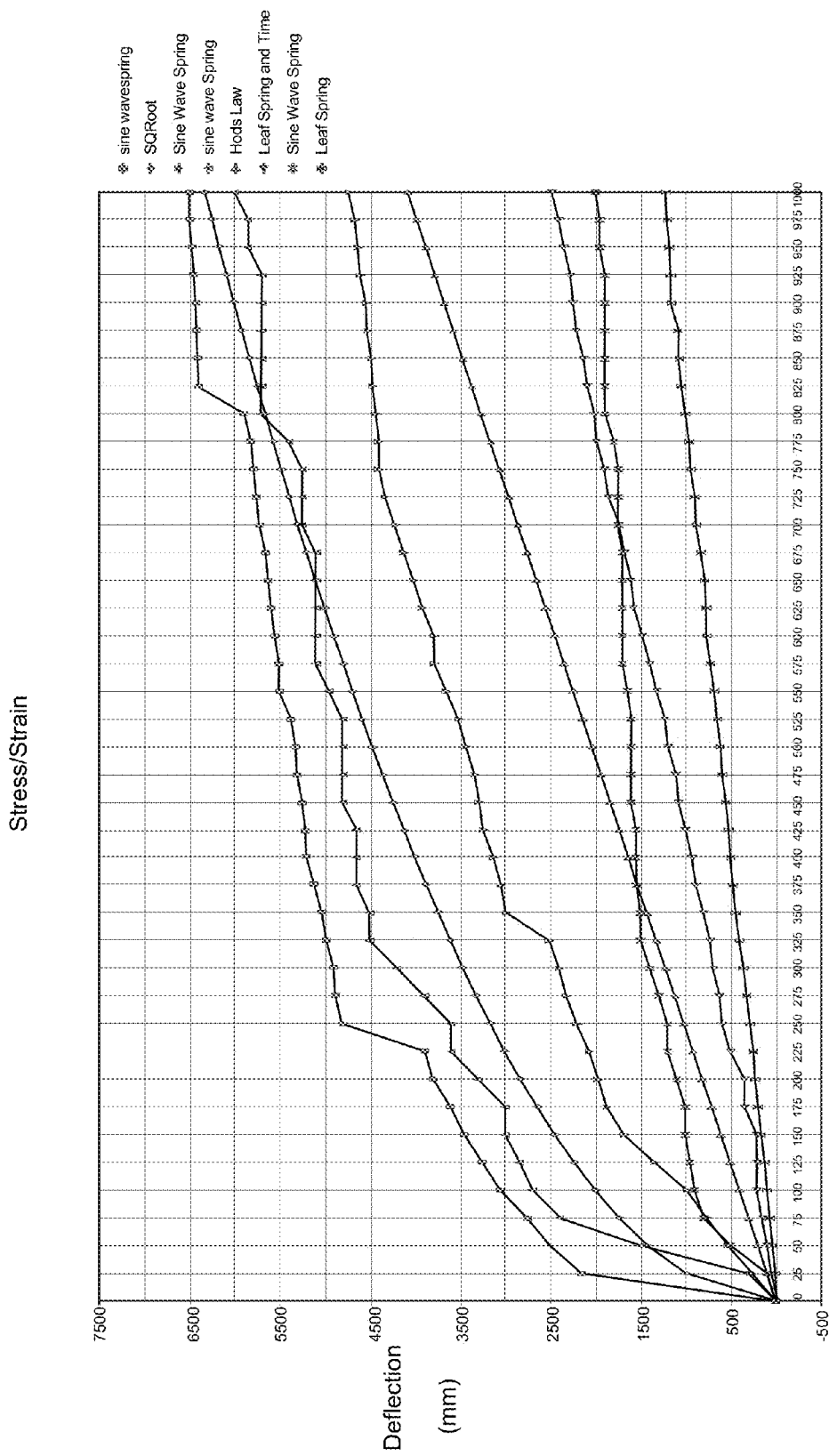
FIG. 44 is a plot illustrating a number of tests of the sine wave spring in various configurations and as compared to other spring types.

A prototype of the present invention was constructed along the lines of FIG. 35, using a small utility trailer as a test platform. The system was tested both statically and dynamically. The results of testing are illustrated in FIGS. 43 and 44. FIG. 43 is a plot of force versus displacement for the sine wave spring of the present invention, illustrating the exponential spring constant of the wedge-shaped sine wave spring. This graph illustrates the test results of a metal spring being used on a trailer in a configuration similar to FIG. 35. FIG. 44 is a plot illustrating a number of tests of the sine wave spring in various configurations and as compared to other spring types. FIG. 44 illustrates four tests that were made of the sine wave spring with different lengths and of a test regular leaf spring and a leaf spring with the tire deflection (in degrees) included in the data. A base line for both the normal spring (straight line) and a sine wave spring (square root line) are also shown on the graph. A factor was added to some of the sine wave data to expand the graph out for clarity.

On the graphs of FIGS. 43 and 44, there is a jump when the spring shifts between notes. The tare weight of the trailer makes it shift down to the first set of waves. Around 225 lbs it shifts, and again around 850 lbs. As with the previous embodiments the spring may make a snapping noise through the phase changes. When there no load is on the trailer it easily shifts but when the trailer is loaded down it does not change as often. If the load was in critical range it would then change phase, as previously discussed with regard to the first embodiment.

The first prototype had a C channel on top and a square tube on the bottom. The second prototype had just a flat plate on top and a channel on bottom. With the flat plate on top, one can witness the spring action, however, that configuration put a lot of side load on the hinge. A third prototype has a C channel on top that is nested over the spring and lower C channel and uses the flanges of the top channel as a guide for the spring.

As with the previous embodiment of the present invention, the variable amplitude sine wave spring may be applied to a number of applications. The following FIGS. 36-42 illustrate some of these applications, although these examples should not be seen as limiting the scope of the present invention. The variable amplitude sine wave spring may also be applied to the embodiments of FIGS. 16-27 above, and vice-versa.

Figure 36:
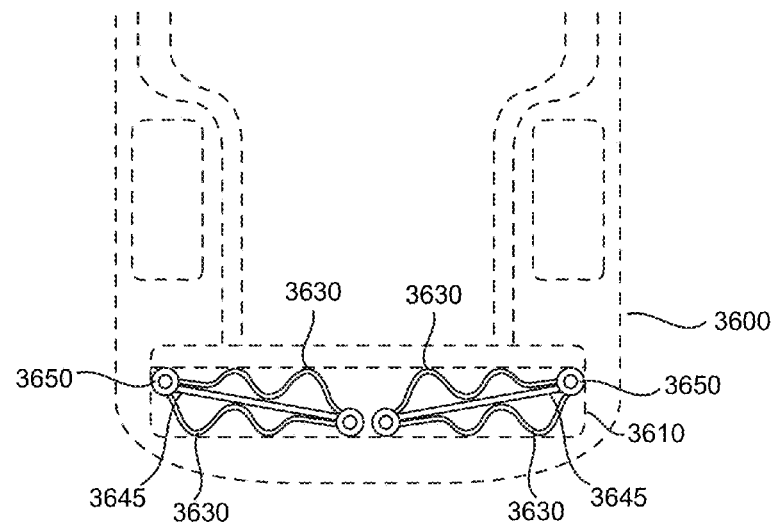
FIG. 36 is a top view of one application of the present invention, for use as a spring in an energy absorbent bumper.

FIG. 36 is a top view of one application of the present invention, for use as a spring in an energy absorbent bumper for a vehicle 3600 in a similar manner to FIGS. 19 and 20 above. In this embodiment of the present invention, the spring pack 3610 may be shaped to the form of a bumper for vehicle 3600, and is lightweight and may be made of plastic. Moreover, since it recovers its shape once pressure is removed, the resulting bumper will "bounce back" from minor collisions. As illustrated in FIG. 36, the vehicle 3600 may be provided with a spring pack 3610 comprising a number of sine wave spring elements 3630 provided in wedge-shaped layers backed by arms 3645 and held under initial tension using pivot points or sliding through bolts 3650 or the like.

When the bumper impacts with an object, the force of impact is transferred to the spring pack 3610, which compresses, causing the spring elements to increase in frequency (form more wavelengths) as the spring pack 3610 compresses. Once pressure is removed from the bumper, the spring pack 3610 will rebound to its original shape, as confined by the pivot points 3560. The spring pack 3610 may be coupled to the bumper fascia using appropriate mechanical links, or alternatively, the spring pack 3610 may be formed in the shape of the bumper, with a urethane bumper fascia mounted over the spring pack 3610.

Figure 37:
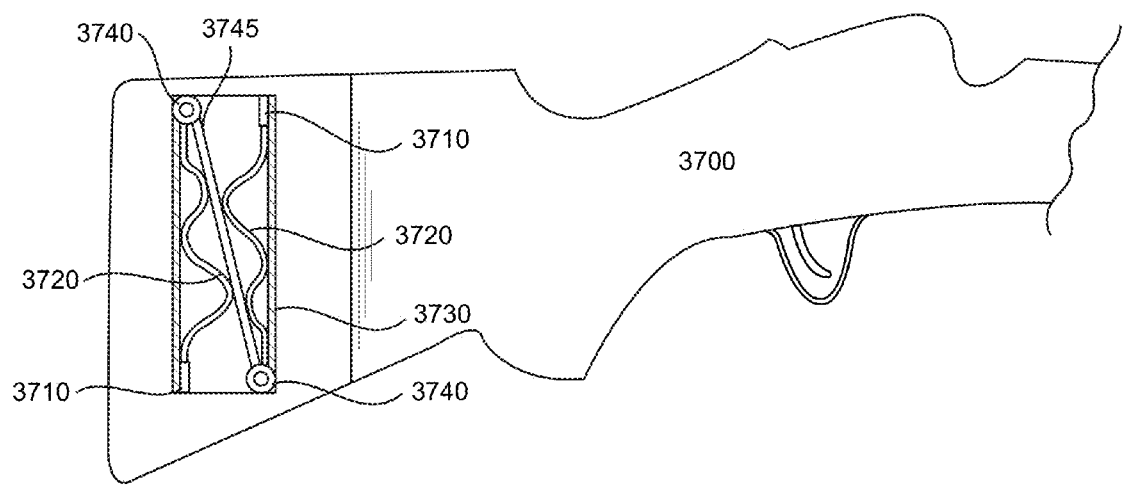
FIG. 37 is a side view of one application of the present invention, for use as a compact gun stock recoil reduction system.

FIG. 37 is a side view of one application of the present invention, for use as a compact gun stock recoil reduction system in a similar manner to FIG. 17, but using variable amplitude sine wave springs, instead. Recoil from a rifle or other weapon 3700 may be difficult to cushion. Traditional Prior Art approaches use linear rate springs, which are bulky and also recoil linearly with the force applied from firing. The springs of the present invention, applied as a pack 3730 in butt of the rifle 3700 as shown in FIG. 37, form a compact and lightweight assembly that can be readily and attractively packaged into the butt of a rifle or other weapon 3700. Moreover, since the spring rate is non-linear, the force from firing will be absorbed in a non-linear manner—as the weapon 3700 is displaced rearward, the spring constant increases exponentially. This exponential spring constant may provide increased accuracy and better shock absorption for the shooter. Spring pack 3730 may be provided with variable amplitude sine wave springs 3720, which may be mounted, via stops 3710, back-to-back on pivot arm 3745 which may mount via pivots 3740 the pack to the butt of rifle or weapon 3700, which in turn may be provided with recesses to allow the butt of rifle or weapon 3700 to move inwardly with the compression of spring pack 3730.

Figure 38:
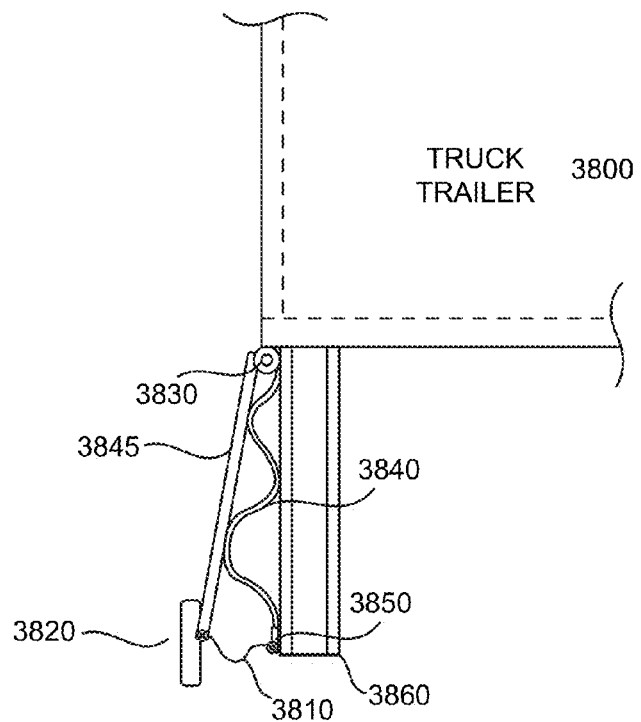

FIG. 38 is a side view of one application of the present invention, for use as a safety bumper spring for a tractor-trailer or the like. In this embodiment, a DOT (Department of Transportation) type safety bumper may be provided on a truck or truck trailer 3800 with a variable amplitude sine wave spring 3840 to absorb impacts from collisions with other vehicles, and also impacts from loading docks and the like. Referring to FIG. 38, bumper frame 3860 may be provided with a variable amplitude sine wave spring 3840 mounted to the bumper frame via stop 3850. Bumper 3820 may be coupled to bumper frame 3860 by pivot 3830. When impacted, the variable amplitude sine wave spring may increase in frequency (form more waves) as in the embodiments described above, absorbing impact energy. When force is removed, the spring returns to its original shape, pushing bumper 3820 back into position. A link, cable, or stop 3810 may be used to hold the variable amplitude sine wave spring 3840 in its primary position.

Figure 39:
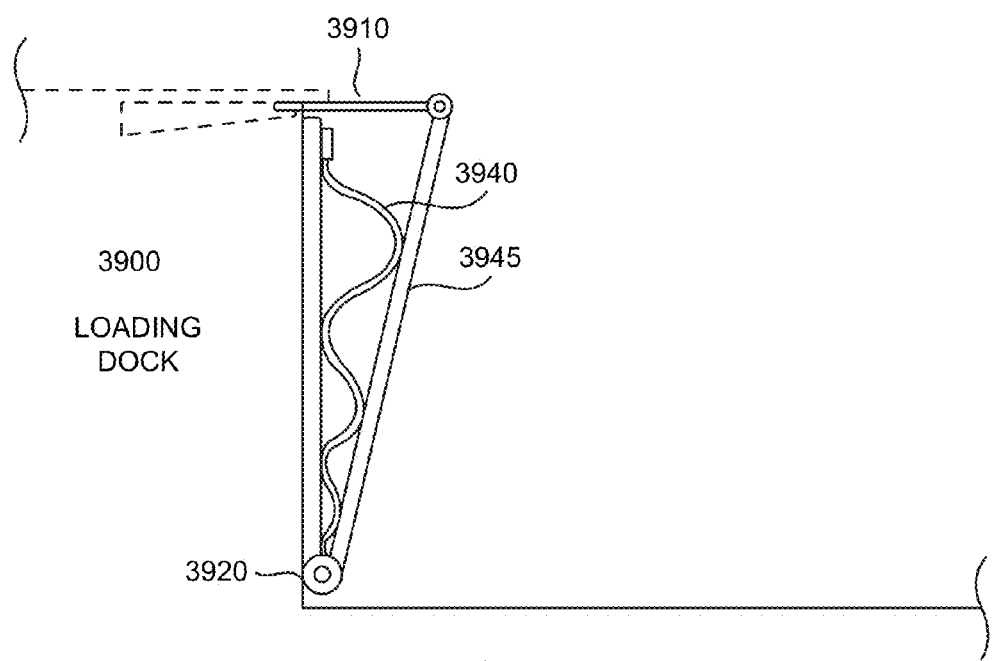
FIG. 39 is a side view of one application of the present invention, for use as a loading dock platform spring.

FIG. 39 is a side view of one application of the present invention, for use as a loading dock platform spring. The embodiment of FIG. 39 works in a similar manner to the embodiment of FIG. 38, but as attached to a loading dock for tractor-trailers and the like. In fact, the embodiment of FIG. 39 may be used in concert with the embodiment of FIG. 38. In this embodiment, loading dock 3900 may be provided with a ramp 3910, which may be adjustably extendable from the loading dock 3900 to a tractor-trailer or truck cargo body (not shown). In a loading dock environment, it is necessary to insure that the loading ramp 3910 is in contact with the trailer or truck cargo body, to prevent workers or forklifts from falling between the loading dock 3900 and trailer or truck body. Thus, a means of extending loading ramp 3910 to the trailer or truck body is essential. In the prior art, hydraulic systems or coil springs have been used. Hydraulic systems require manual extension and thus are not automatic in nature. Coil spring systems may provide impact cushioning, but do not necessarily provide the extension necessary to bridge the gap between loading dock 3900 and a trailer or truck body.

In the embodiment of FIG. 38, a variable amplitude sine wave spring 3940 may be used to force extension of loading ramp 3910. Note that with suitable modification, the embodiment of FIG. 39 may be implemented with the linear sine wave spring previously disclosed. Load ramp 3910 may be coupled to arm 3945, which may be attached to loading dock 3900 via pivot 3920. When a vehicle is backed against loading dock 3900, it contacts loading ramp 3910, which in turn compressed variable amplitude sine wave spring 3940 via arm 3945, forcing loading ramp 3910 back, but maintaining pressure against the vehicle. The snapping noise produced by the springs may serve as an audible feedback mechanism for the driver, so that he knows he has contacted the loading dock. Once the vehicle is driven away, the loading ramp 3910 may extend back to its original position, held in place by suitable stops, stop linkages, or cables (not shown).

Figure 40:
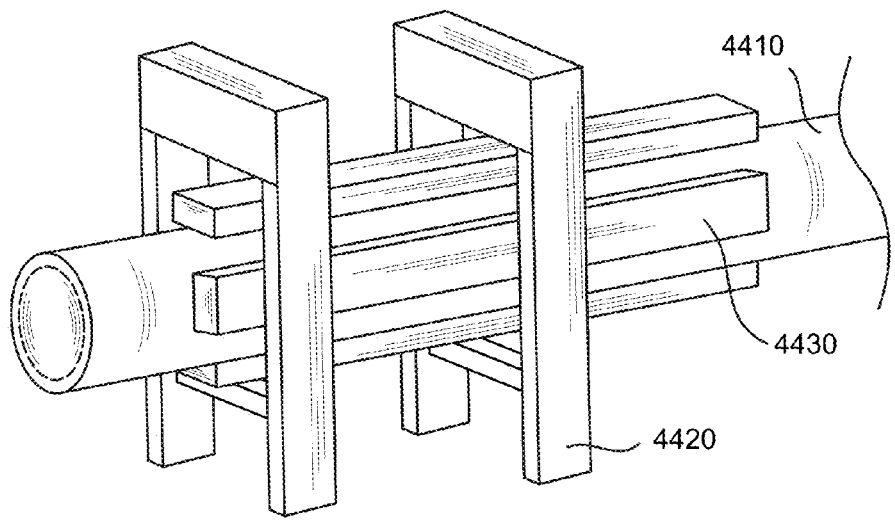
FIG. 40 is a perspective view of one application of the present invention, for use as a pipe support.

FIG. 40 is a perspective view of another one application of the present invention, for use as a pipe support in a similar manner to FIG. 24. In this embodiment, a support for a pipe 4410, as in an industrial complex, oil or natural gas pipeline, or the like, may be provided by using one or more variable wavelength sine wave springs 4430 or spring packs of the present invention. The spring packs 4430, mounted to a support frame 4420, may be constructed of a plurality of variable amplitude sine wave springs, placed back-to-back in a similar arrangement to that used in FIGS. 36 and 37. These spring packs 4430 cushion the pipeline from shock, which reduces the incidence of stress cracking and the like. The spring packs 4430 also absorb vibrations and accommodate expansion and contraction of pipes with temperature and the like. The spring packs 4430 may dampen oscillations due to earthquakes and the like as well. In addition to spring packs 4430, a support spring may be provided to mount the assembly to a frame 4420 and provide additional cushioning for the pipe 4410. This spring arrangement may be particularly useful in preventing pipeline spills due to stress cracking and the like induced by solid or rigid pipe mounts.

Figure 41:
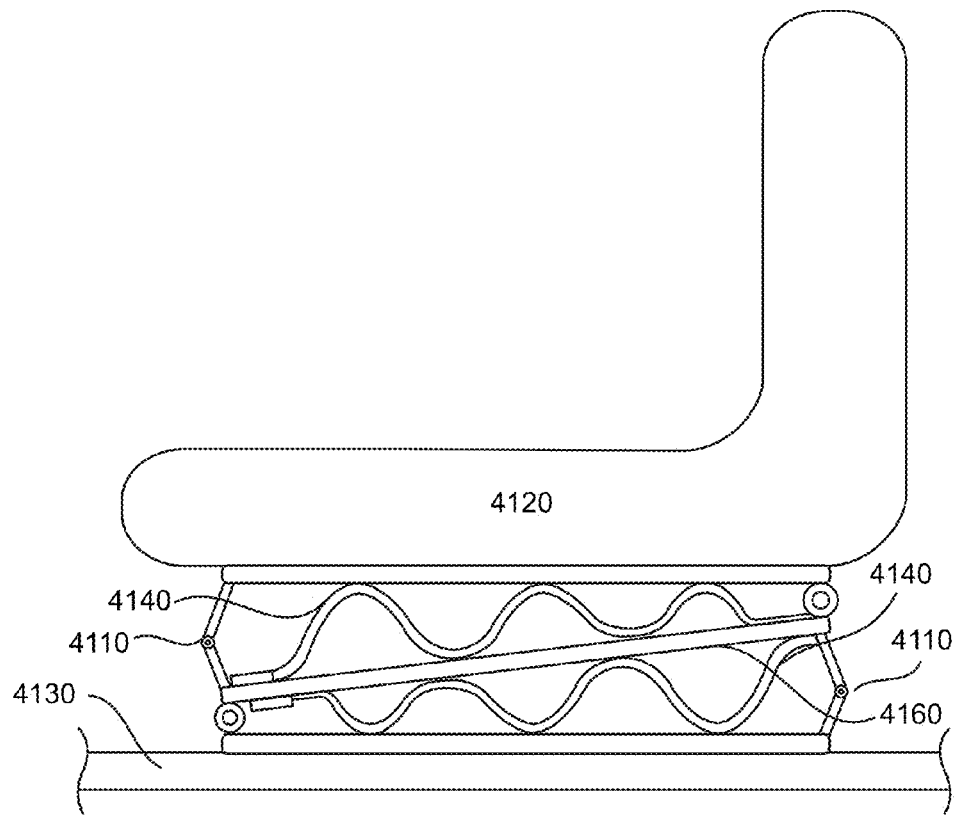

FIG. 41 is a perspective view of one application of the present invention, for use as spring seat support for a vehicle or the like, in a similar manner to the embodiment of FIG. 23. In this embodiment, a support for a vehicle seat 4120, particularly for an off-road vehicle, military vehicle, or other vehicle experiencing large impacts and shocks to the driver (e.g., dirt bike or the like) is provided. The support may include one or more layers of variable amplitude sine wave springs 4140 of the present invention, pre-stressed in an initial configuration using a pivoted lever arm 4160, as in other embodiments. When the vehicle travels over a bump, the sine wave springs 4140 may compress initially, and then rebound. Stops 4110 may prevent the springs from completely decompressing, and may be formed as pivoting links (as shown) or by using cables or other devices. Fine-tuning of the seat springs 4140 (or springs in any of the applications noted herein) may be achieved by altering the thickness or material type of the flexible members used for the sine wave springs. Multiple layers of differing thickness or materials may be used so as to provide tailor-made spring rates for different applications. Due to the self-dampening nature of the sine wave spring, oscillations are not as prevalent as with traditional leaf, coil, and torsion bar springs.

Figure 42:
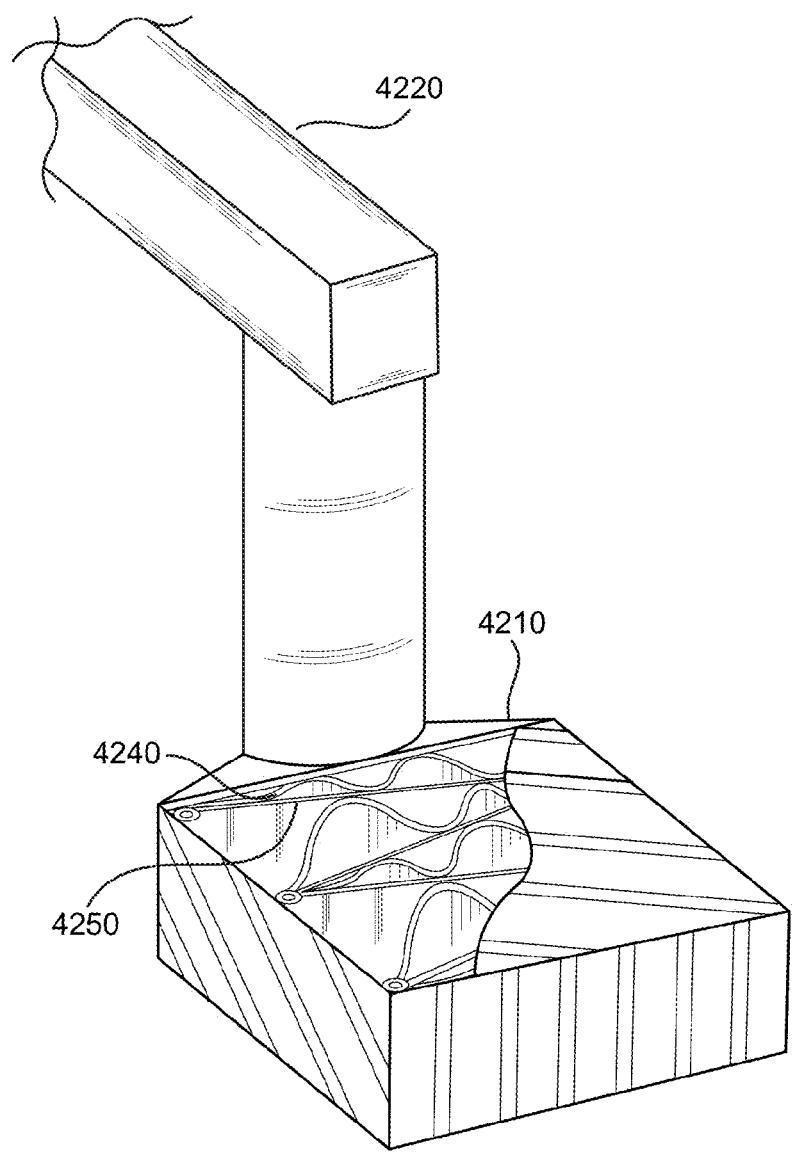
FIG. 42 is a perspective view of one application of the present invention for use as a crash barrier for a highway guard rail or the like FIG. 43 is a plot of force versus displacement for the sine wave spring of the present invention, illustrating the exponential spring constant of the wedge-shaped sine wave spring.

FIG. 42 is a perspective view of one application of the present invention for use as a crash barrier for a highway guard rail 4220 or the like. In FIG. 42, a crash barrier 4210 may be formed from a number of layers of variable amplitude sine wave springs 4240 separated by planar surfaces 4250 and held together with pivot mechanisms to keep the entire package under initial tension. As in the embodiment of FIG. 16, such a crash barrier may be lightweight and readily deployable, and also inexpensive to construct. In addition, since the barrier rebounds to its initial shape, there is no need to replace the barrier once an impact has occurred (unless the impact exceeds the shock absorption capability of the barrier) as the barrier will rebound to its original shape.

While the preferred embodiment and various alternative embodiments of the invention have been disclosed and described in detail herein, it may be apparent to those skilled in the art that various changes in form and detail may be made therein without departing from the spirit and scope thereof.

For example, the springs of the present invention may be provided individually, in stacked groups, or in a stacked "V" shape pattern as well as the parallel configurations.

I claim:

1. A spring assembly comprising at least one variable amplitude sine wave spring, each of the at least one variable amplitude sine wave springs comprising:
   a lower platen having first and second spring stops located at a predetermined distance apart on the face thereof;
   a flat flexible spring material having a length greater than the predetermined distance between the first and second spring stops, the flat flexible material placed on the lower platen between the first and second spring stops and fixed only to the first and second spring stops such that the spring material forms at least one bowed portion extending away from the lower platen, when the flat flexible spring material is placed on the first and second spring stops, the at least one bowed portion not fixed to either of the upper or lower platen; and
   an upper platen, hinged to and non-parallel to the lower platen and placed atop the flat flexible spring material and in contact with the at least one bowed portion of the flat flexible spring material, the upper platen being hinged to the lower platen at one end such that another end of the upper platen may move relative to the lower platen such that, as force is applied to the upper platen toward the lower platen, the flat flexible spring material is compressed to thereby form additional bowed portions over the length of the flat flexible spring material of variable height extending between the lower platen and upper platen in response to the force applied between the upper platen and lower platen, and as the force is removed from the upper platen, the flat flexible spring material rebounds, forming fewer bowed portions of variable height in response to release of the force applied between the upper platen and the lower platen.

2. The spring assembly of claim 1, wherein the flat flexible spring material comprises one or more of biaxially-oriented polyethylene terephthalate, spring steel, hardened and tempered aluminum, and epoxy impregnated carbon fiber.

3. The spring assembly of claim 1, wherein the first and second spring stops are located a distance $B_{Fix}$ apart from one another, and the flat flexible spring material has a length $B_{Mat}$ substantially equal to one and one-sixteenth $B_{Fix}$.

4. The spring assembly of claim 1, wherein force needed to compress the at least one sine wave spring is defined by the formula:

$$F=(E*m*n)/r,$$

where F is the force or load on the spring,
r is a factor based on the radius of curvature of the shoulders, n is the total number of "node shoulders" per phase, defined as the number of corners formed in the flat flexible spring material, when the at least one bowed portion is compressed, m is a predetermined factor based on the thickness and width of the material used, and E is Young's modulus of elasticity.

5. A spring assembly comprising at least one variable amplitude sine wave spring, each of the at least one sine variable amplitude wave springs comprising:
   a lower platen having first and second spring stops located at a predetermined distance apart on the face thereof;
   a flat flexible spring material having a length greater than the predetermined distance between the first and second spring stops, the flat flexible spring material placed on the lower platen between the first and second spring stops and fixed only to the first and second spring stops such that in such a manner than the flat flexible spring material forms at least one bowed portion extending away from the lower platen, when the flat flexible spring material is placed on the first and second spring stops, the at least one bowed portion not fixed to either of the upper or lower platen; and
   an upper platen, hinged to and non-parallel to the lower platen and placed atop the flat flexible spring material and in contact with the at least one bowed portion of the flat flexible spring material, the upper platen being hinged to the lower platen at one end such that another end of the upper platen may move relative to the lower platen such that as the force is applied to the upper platen is brought toward the lower platen, the flat flexible spring material forms additional bowed portions of variable height in response to the force applied between the upper lower platen and upper lower platen, and as the force is removed from the upper platen, the flat flexible spring material rebounds, forming fewer bowed portions of variable height in response to release of the force applied between the upper platen and the lower platen,
   wherein the spring assembly comprises a pair of variable amplitude sine wave springs stacked together, wherein the upper platen of a first of the pair of the variable amplitude sine wave springs and the upper platen of the second of the pair of the variable amplitude sine wave springs are combined into a single platen, such that a first portion of the first of the variable amplitude sine wave springs having a lower amplitude faces a second portion of the second of the variable amplitude sine wave springs having a higher amplitude.

6. The spring assembly of claim 5, further comprising a retainer for retaining the plurality of variable amplitude sine wave springs when not under load.

7. The spring assembly of claim 6, wherein the spring assembly is formed as a crash barrier, placing the first and second platens in a vertical orientation to form a compressible upright barrier.

8. The spring assembly of claim 6, wherein the spring assembly forms a recoil mechanism for a weapon, the spring assembly mounted into a weapon stock.

9. The spring assembly of claim 6, wherein the spring assembly forms an automotive suspension the spring assembly mounted between a frame and an axle of a vehicle.

10. The spring assembly of claim 6, wherein the spring assembly forms an energy absorbent bumper assembly, mounted between a frame member and an external bumper cover of a vehicle.

11. The spring assembly of claim 6, wherein the spring assembly forms a seat support, mounted between a vehicle seat and a vehicle, to provide support for a vehicle seat.

12. The spring assembly of claim 6, wherein the spring assembly forms a pipe support, flexibly mounting a pipe to a support.

13. The spring assembly of claim 6, wherein the spring assembly forms a beam support, flexibly mounting a beam to a base.

14. The spring assembly of claim 6, wherein the spring assembly forms a scale, wherein weight applied to the spring assembly is measured by displacement of the spring assembly.

15. The spring assembly of claim 6, wherein the spring assembly forms a scale, wherein weight applied to the spring assembly is measured by the number of bow portions formed in the flat flexible spring material.

16. A variable amplitude sine wave spring comprising:
   a first platen having first and second spring stops located at a predetermined distance apart on the face thereof;
   a flat flexible spring material having a length greater than the predetermined distance between the first and second spring stops, the flat flexible spring material placed on the first platen between the first and second spring stops and fixed only to the first and second spring stops such that the flat flexible spring material forms at least one sine-wave shaped portion extending away from the first platen, when the flat flexible spring material is placed on the first and second spring stops, the at least one bowed portion not fixed to either of the first platen or the second platen; and
   a second platen, hinged to and non-parallel to the first platen, placed atop the flat flexible spring material and in contact with the at least one bowed portion of the flat flexible spring material, the second platen being hinged to the first platen at one end such that another end of the second platen may move relative to the first platen such that, as force is applied to the second platen toward the first platen, the flat flexible spring material forms an increasing number of sine-wave shaped portions of varying amplitude as and sine-wave shaped nodes in response to force applied between the first platen and the second platen, and as the force is removed from the second platen, the flat flexible spring material rebounds, forming fewer variable amplitude sine-wave shaped portions in response to release of the force applied between the first platen and the second platen.

17. The sine wave spring of claim 16, wherein the flat flexible spring material comprises one or more of biaxially-oriented polyethylene terephthalate, spring steel, hardened and tempered aluminum, and epoxy impregnated carbon fiber.

18. The sine wave spring of claim 16, wherein the first and second spring stops are located a distance $B_{Fix}$ apart from one another, and the flat flexible spring material has a length $B_{Mat}$ substantially equal to one and one-sixteenth $B_{Fix}$.

19. The sine wave spring of claim 16, wherein force needed to compress the at least one sine wave spring is defined by the formula:

$$F = (E * m * n)/r,$$

where F is the force or load on the spring,
r is a factor based on the radius of curvature of the shoulders, n is the total number of "node shoulders" per phase, defined as the number of corners formed in the flat flexible spring material, when the at least sine wave nodes are compressed, m is a predetermined factor based on the thickness and width of the material used, and E is Young's modulus of elasticity.

20. The sine wave spring of claim 16, wherein the sine wave spring further comprises:

at least one retaining member for retaining the flat flexible spring material when not under load.

* * * * *